United States Patent
Fraim et al.

(10) Patent No.: US 10,259,726 B2
(45) Date of Patent: Apr. 16, 2019

(54) ELECTROLYTIC CELL WITH ADVANCED OXIDATION PROCESS AND ELECTRO CATALYTIC PADDLE ELECTRODE

(71) Applicant: GLOBAL WATER HOLDINGS, LLC, Stuart, FL (US)

(72) Inventors: Michael Fraim, College Station, TX (US); Sanjeev Jakhete, Stuart, FL (US)

(73) Assignee: GLOBAL WATER INVESTMENTS, LLC a Delaware Limited Liability Company, Palm City, FL (US)

(*) Notice: Subject to any disclaimer, the term of this patent is extended or adjusted under 35 U.S.C. 154(b) by 0 days.

(21) Appl. No.: 14/539,345

(22) Filed: Nov. 12, 2014

(65) Prior Publication Data
US 2015/0136591 A1 May 21, 2015

Related U.S. Application Data

(63) Continuation-in-part of application No. 13/333,413, filed on Dec. 21, 2011, now Pat. No. 8,945,353.

(51) Int. Cl.
| | |
|---|---|
| *C02F 1/461* | (2006.01) |
| *C02F 1/467* | (2006.01) |
| *C25B 9/06* | (2006.01) |
| *C02F 1/00* | (2006.01) |
| *C02F 1/36* | (2006.01) |
| *C02F 1/46* | (2006.01) |
| *C02F 1/34* | (2006.01) |
| *C02F 1/72* | (2006.01) |

(Continued)

(52) U.S. Cl.
CPC ............ *C02F 1/4672* (2013.01); *C02F 1/006* (2013.01); *C02F 1/34* (2013.01); *C02F 1/36* (2013.01); *C02F 1/4606* (2013.01); *C02F 1/4608* (2013.01); *C02F 1/46104* (2013.01); *C02F 1/72* (2013.01); *C25B 9/06* (2013.01); *C02F 1/32* (2013.01); *C02F 1/727* (2013.01); *C02F 1/78* (2013.01); *C02F 2001/46142* (2013.01); *C02F 2001/46147* (2013.01);

(Continued)

(58) Field of Classification Search
None
See application file for complete search history.

(56) References Cited

U.S. PATENT DOCUMENTS 4,036,726 A * 7/1977 Gale .................... C02F 1/463
 204/229.6
5,993,749 A * 11/1999 Adams ..................... A61L 2/02
 422/186.01

(Continued)

*Primary Examiner* — Harry D Wilkins, III
(74) *Attorney, Agent, or Firm* — Daniel S. Polley

(57) ABSTRACT

Electrolytically treating water through influent inlet arrangements for cavitation and one or more pairs of electrodes. The electrodes can provide continuous anodic and cathodic operation for treating water. The pressurized influent pre-mixed with oxidant gas can be pumped into the reactor vessel through the mixing nozzles arranged radially along the circumference. The polarity of the current to the electrode can be periodically reversed at a set interval. An electro-catalytic paddle electrode can be used for the treatment of flowback and produced water. The paddle electrode can consists of alternate pentagonal flat plate electrodes separated by adjustable variable distance Teflon spacers. The paddle electrode is provided with a chemical coating capable of switching/reversing the polarity of anodes and cathodes at ultra high frequencies under very high current flowing conditions thus making it more efficient, stable and durable under demanding field conditions.

24 Claims, 21 Drawing Sheets

CUT VIEW OF THE PLACEMENT OF NOVEL ELECTRO CATALYTIC PADDLE ELECTRODE ON CYLINDRICAL REACTOR

REACTOR INTERNAL ARRANGMENTS

(51) Int. Cl.
    *C02F 101/16* (2006.01)
    *C02F 1/32* (2006.01)
    *C02F 1/78* (2006.01)
    *C02F 103/00* (2006.01)

(52) U.S. Cl.
    CPC ........... *C02F 2001/46152* (2013.01); *C02F 2001/46171* (2013.01); *C02F 2101/16* (2013.01); *C02F 2103/001* (2013.01); *C02F 2201/4611* (2013.01); *C02F 2201/4613* (2013.01); *C02F 2201/4618* (2013.01); *C02F 2201/4619* (2013.01); *C02F 2201/46105* (2013.01); *C02F 2301/024* (2013.01); *C02F 2301/026* (2013.01); *C02F 2305/023* (2013.01)

(56) References Cited

U.S. PATENT DOCUMENTS

| | | | |
|---|---|---|---|
| 6,238,546 B1* | 5/2001 | Knieper | C02F 1/46104 204/269 |
| 8,137,514 B2* | 3/2012 | Kim | A61M 11/02 204/271 |
| 8,852,410 B1* | 10/2014 | Turgeon | C25B 15/02 204/267 |
| 2002/0074237 A1* | 6/2002 | Takesako | B23H 3/08 205/628 |
| 2009/0230059 A1* | 9/2009 | McGuire | C02F 9/00 210/638 |
| 2010/0038238 A1* | 2/2010 | Reiser | C02F 1/46109 204/290.15 |
| 2010/0133097 A1* | 6/2010 | Fawcett | C25B 1/04 204/275.1 |
| 2010/0193359 A1* | 8/2010 | Mierswa | C02F 1/48 204/554 |
| 2011/0057455 A1* | 3/2011 | Russo | C25B 1/04 290/1 A |
| 2012/0205301 A1* | 8/2012 | McGuire | C02F 1/36 210/151 |
| 2012/0234265 A1* | 9/2012 | Ball | C25B 1/08 123/3 |
| 2014/0322632 A1* | 10/2014 | Sugimoto | C23C 18/08 429/532 |

* cited by examiner

ELECTRO-CHEMICAL
CELL REACTOR

ELECTRO-CHEMICAL CELL PROCESS

ELECTROLYTIC CELL

CROSS SECTIONAL VIEW
OF ELECTROLYTIC CELL

TOP CROSS SECTIONAL VIEW
OF ELECTRO-CHEMICAL CELL.

END VIEW OF ELECTROLYTIC CELL

FIG. 8 TOP VIEW: ADVANCED OXIDATION PROCESS USING ELECTROCHEMICAL CHAMBER AND REACTOR PIPE

FIG. 9 FRONT VIEW: ADVANCED OXIDATION PROCESS USING ELECTROCHEMICAL CELL AND REACTOR PIPE.

ADAVANCED OXIDATION PROCESS WITH ELECTRO-CHEMICAL CELL AND REACTOR PIPE

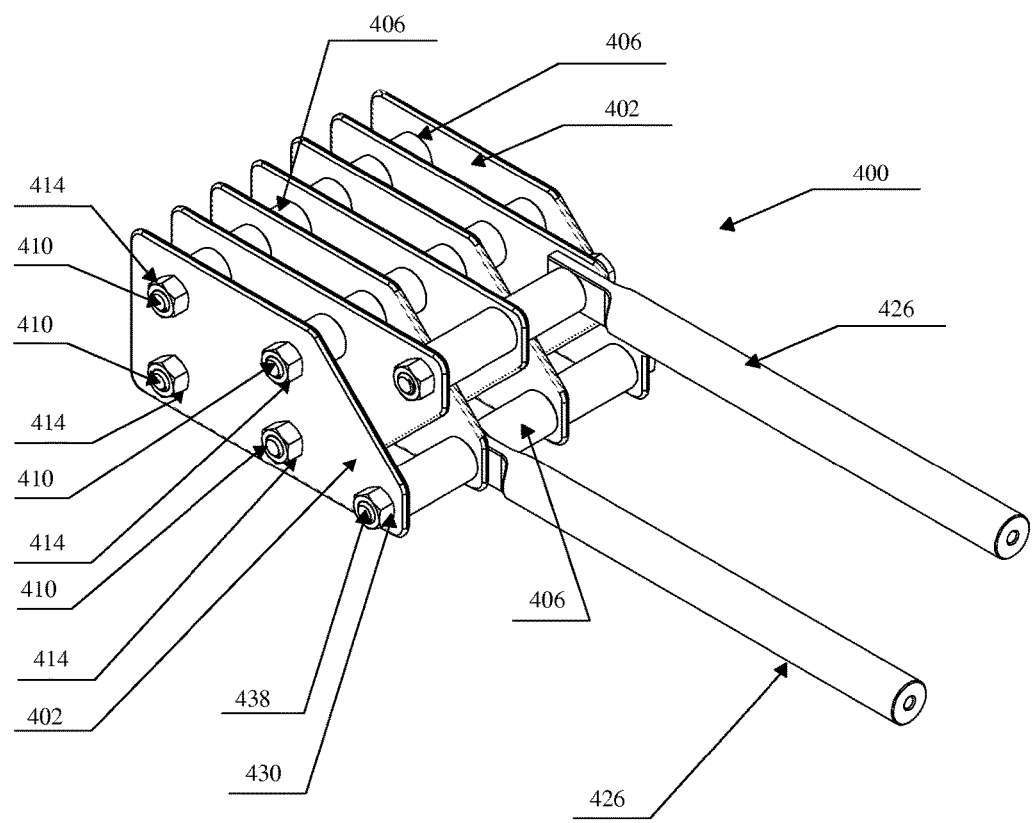
FIGURE 11: OVER ALL LOOK OF NOVEL ELECTRO CATALYTIC PADDLE ELECTRODE

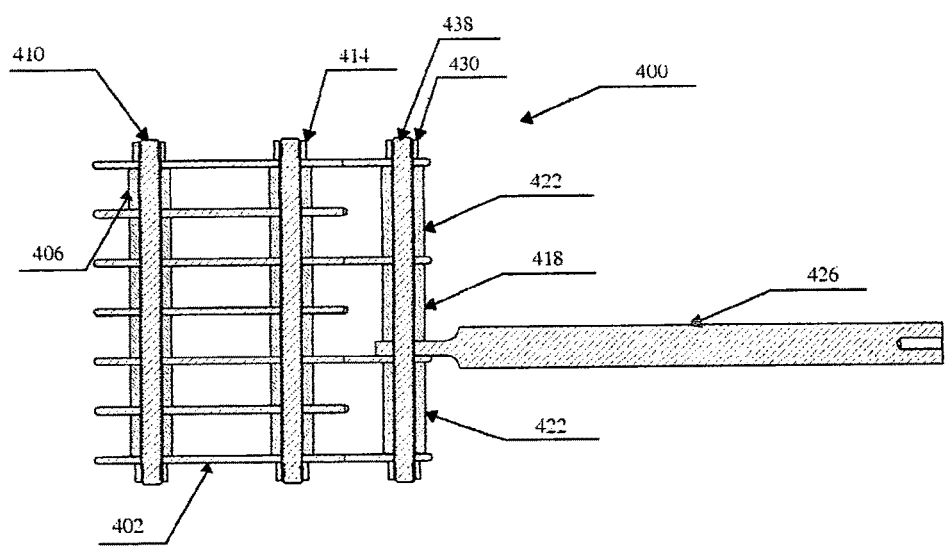
FIGURE 12: DETAILED CONSTRUCTION OF THE NOVEL ELECTRO-CATALYTIC PADDLE ELECTRODE

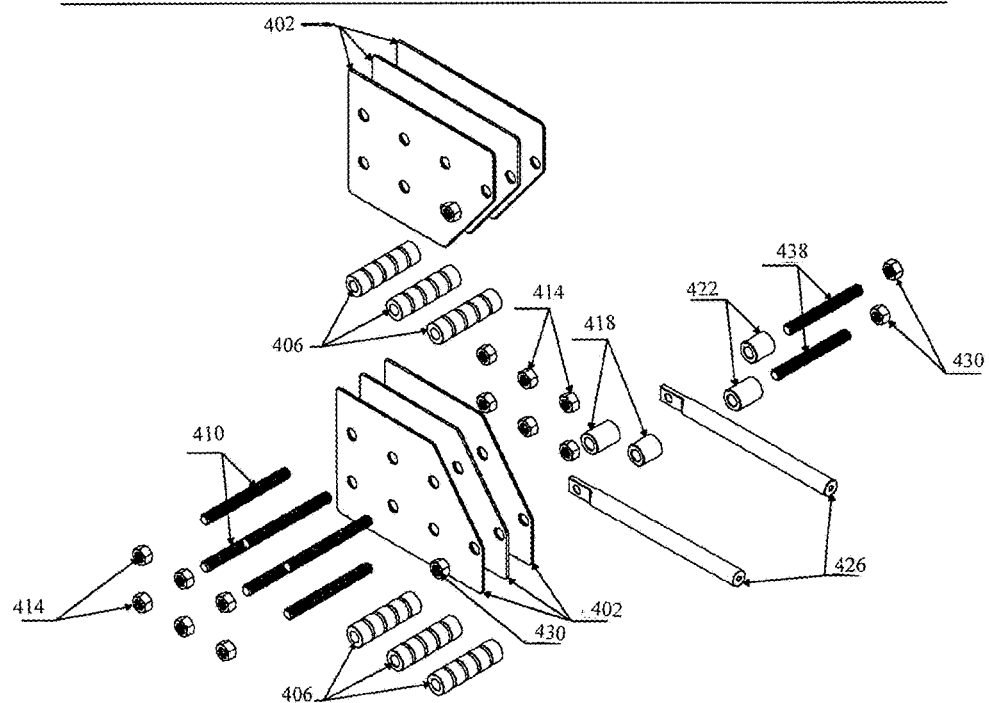
FIGURE 13: EXPLODED VIEW OF THE VARIOUS COMPONENTS OF NOVEL ELECTRO-CATALYTIC PADDLE ELECTRODE FIGURE 14A: NOVEL ELECTRO CATALYTIC PADDLE ELECTRODE ATTACHED ON TO MOUNTING PLATE
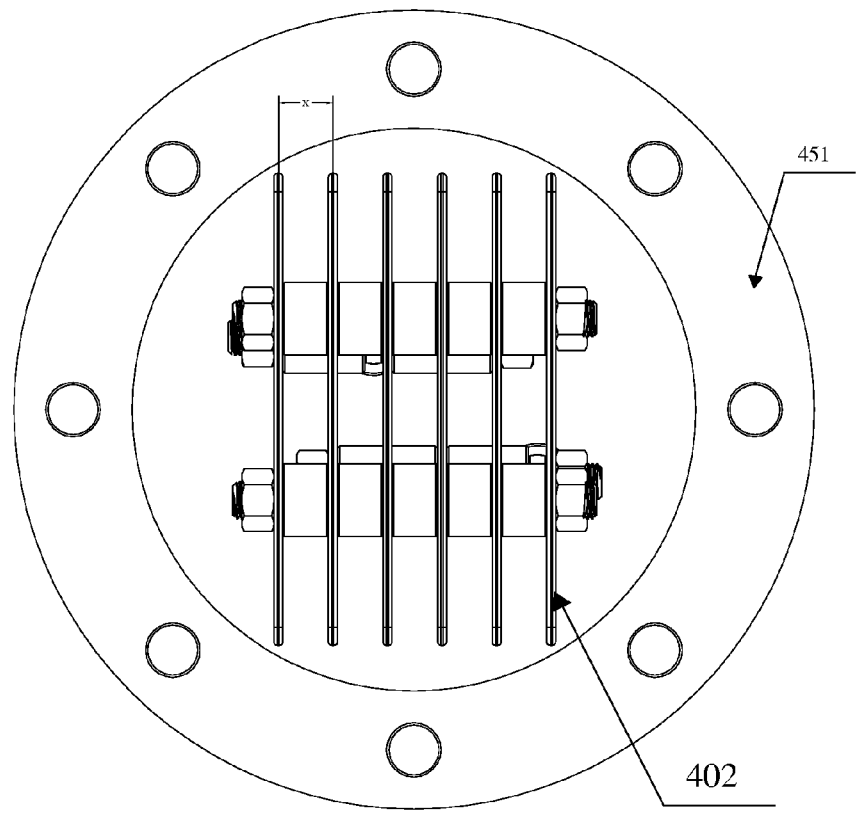
FIGURE 14B: PERSPECTIVE VIEW
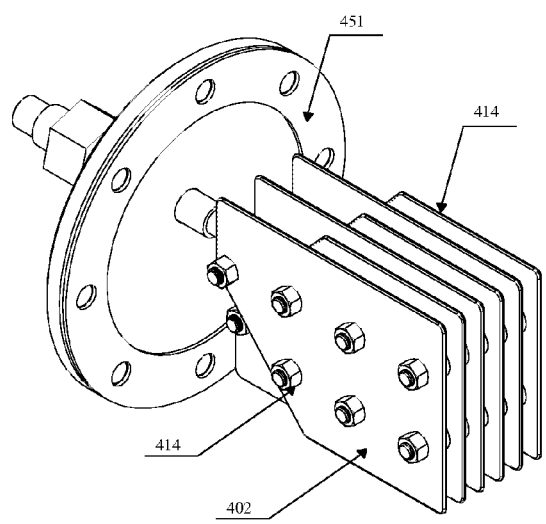

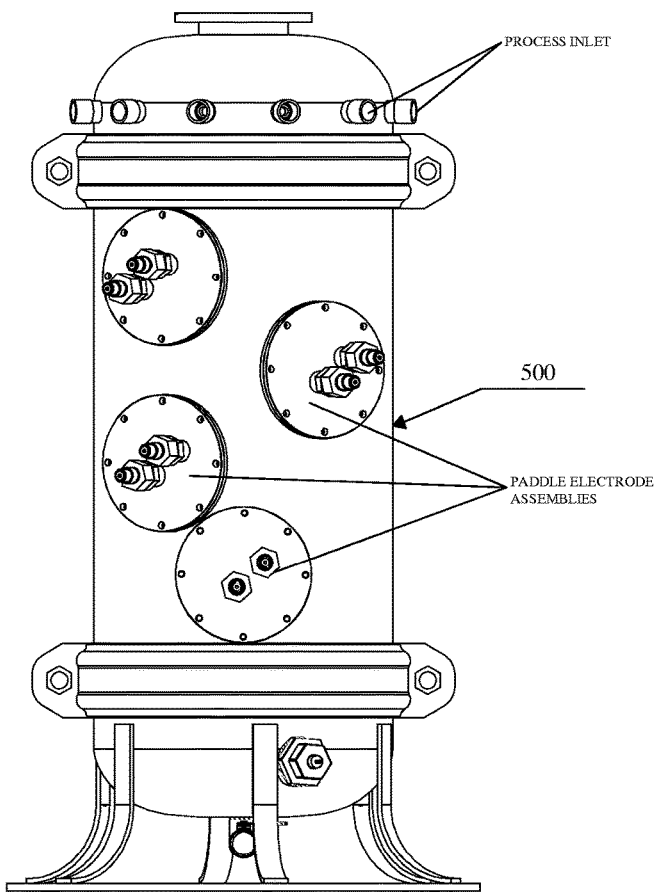
FIGURE 15: FRONT VIEW OF THE PLACEMENT OF NOVEL ELECTRO CATALYTIC PADDLE ELECTRODE ON CYLINDRICAL REACTOR
ELECTRO-CATALYST REACTOR WITH PLATE TYPE PADDLE ELCTRODES

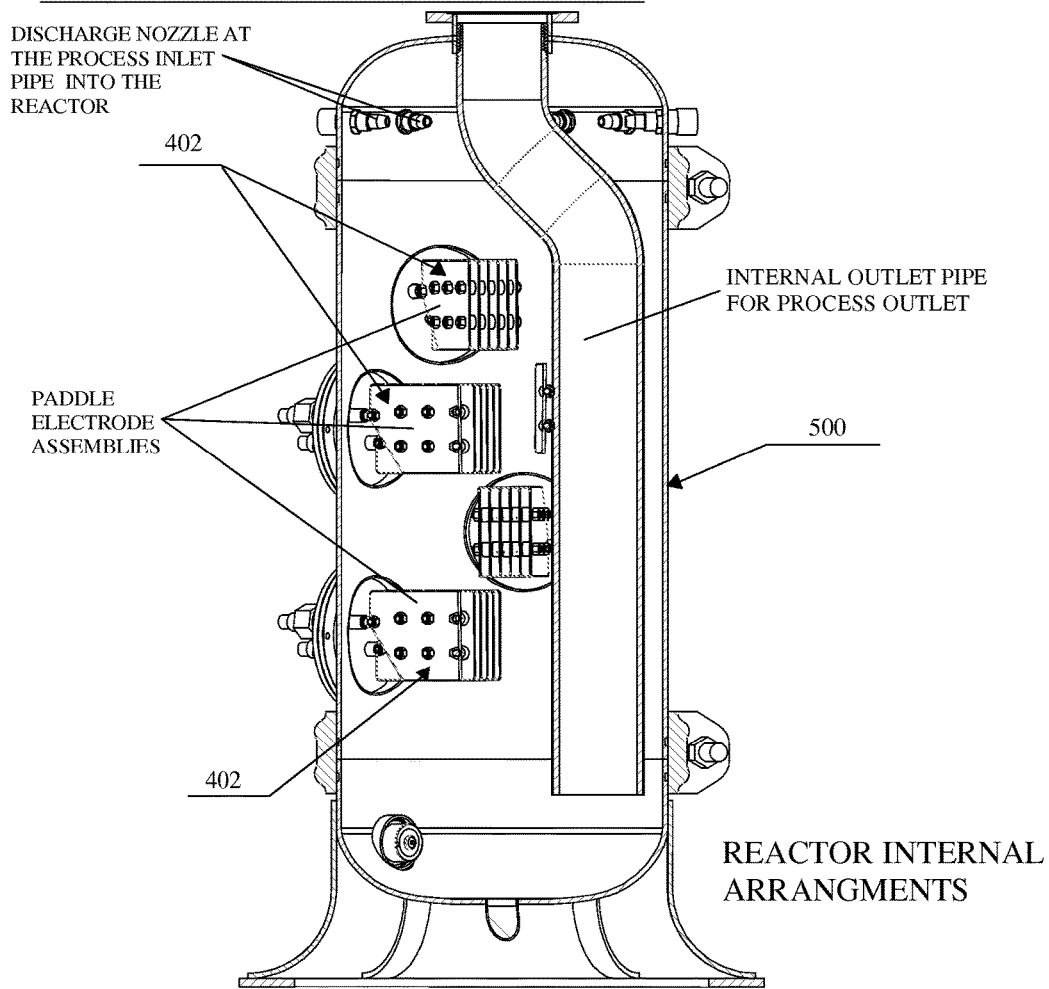
FIGURE 16: CUT VIEW OF THE PLACEMENT OF NOVEL ELECTRO CATALYTIC PADDLE ELECTRODE ON CYLINDRICAL REACTOR FIGURE 17: FRONT VIEW OF THE PLACEMENT OF NOVEL ELECTRO CATALYTIC PADDLE ELECTRODE ON RECTANGULAR REACTOR
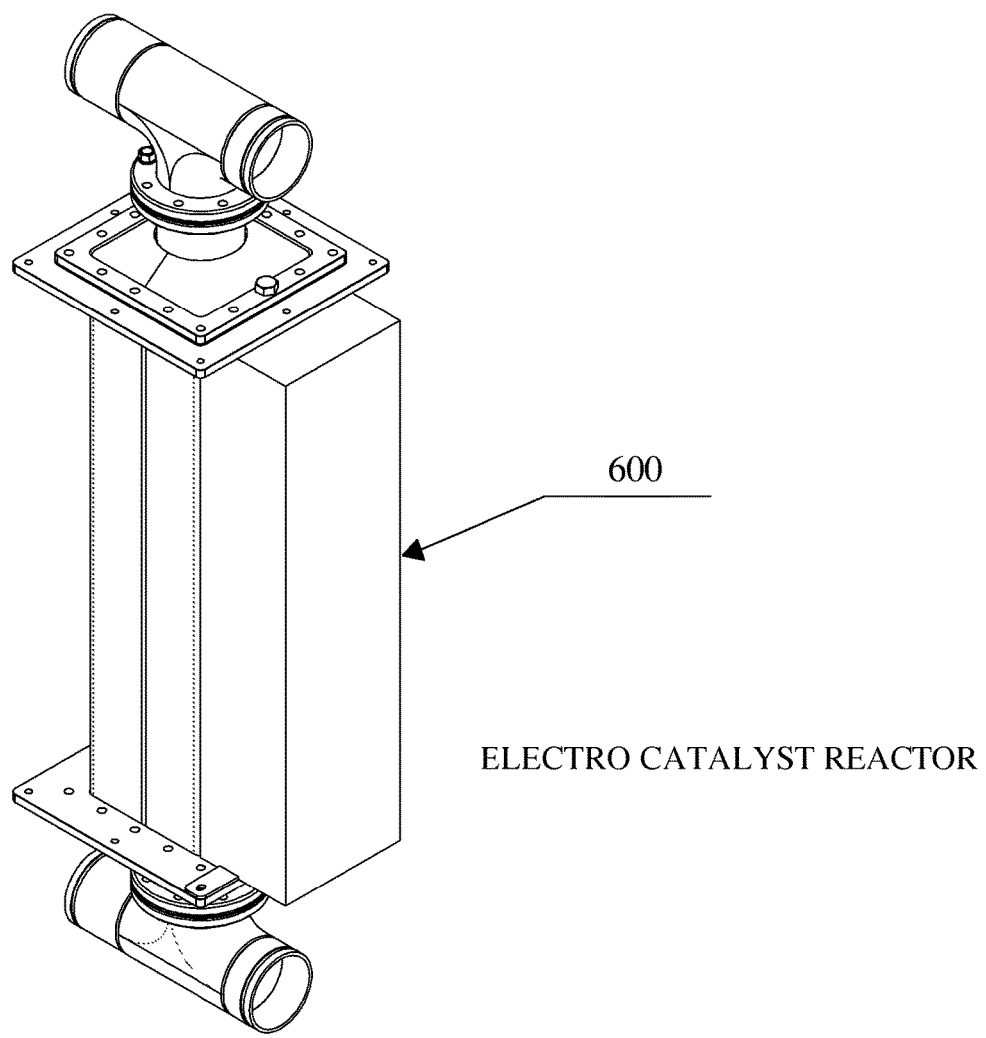
600
ELECTRO CATALYST REACTOR

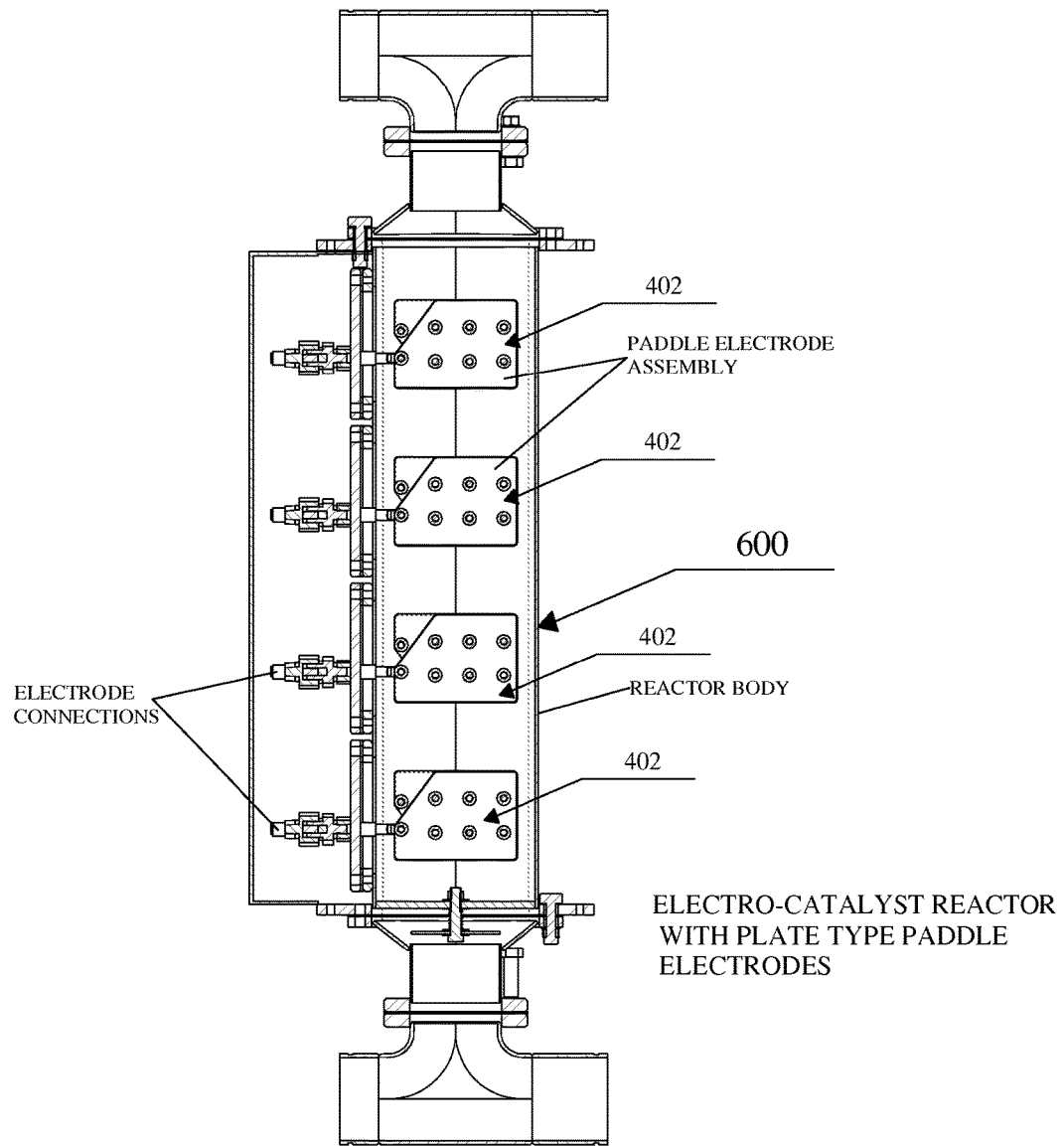
FIGURE 18: CUT VIEW OF THE PLACEMENT OF NOVEL ELECTRO CATALYTIC PADDLE ELECTRODE ON RECTANGULAR REACTOR FIG 19: DETAILS OF PENTAGONAL PLATE ELECTRODE
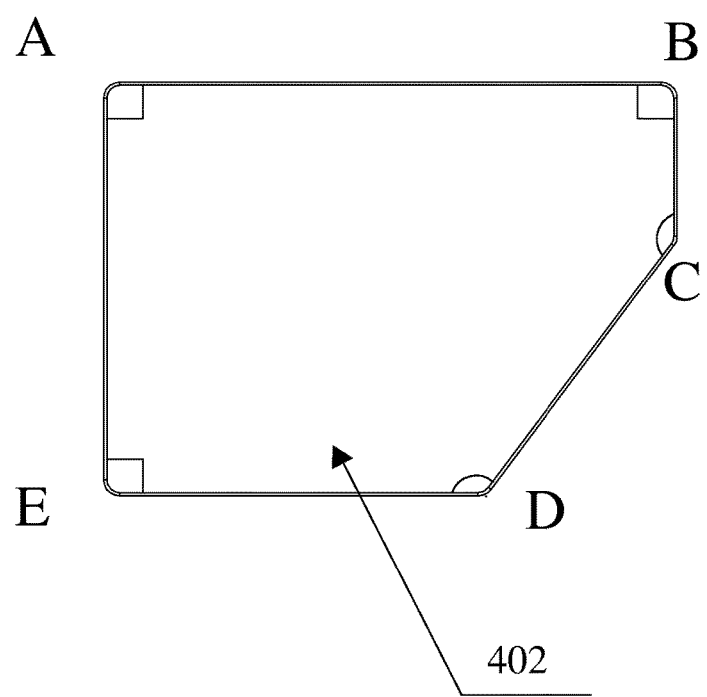

VARIOUS FEATURES ON THE PENTAGONAL PLATE ELECTRODES

402

402

VARIOUS FEATURES ON THE PENTAGONAL PLATE ELECTRODES

402

402

ELECTROLYTIC CELL WITH ADVANCED OXIDATION PROCESS AND ELECTRO CATALYTIC PADDLE ELECTRODE

This application is continuation-in-part of U.S. application Ser. No. 13/333,413, filed Dec. 21, 2011, which application is incorporated by reference in its entirety.

FIELD OF THE DISCLOSURE

The disclosure relates generally to the field of water treatment and more particularly to the recovery of ammonia and urea in processed sewage water, agriculture runoff water and industrial wastewater through the use of an electrolytic reactor cell. The disclosure also relates generally to the electro-catalytic oxidation treatment of fluid and more particularly to creating oxidizing species in fluid using electro catalytic oxidation of fluid constituents. The disclosure is also directed to precipitation of dissolved salts using electrolysis.

BACKGROUND OF THE DISCLOSURE

Electrolysis is a process whereby the electric current is used to promote the decomposition of contaminants in the influent. The use of an electrolytic cell in water treatment industry is known for years. These applications include production of required oxidants in the process and use them to eliminate harmful and unwanted organism. Most modern sewage treatment facilities and modern agriculture mature treatment facilities are using an initial anaerobic solids digestion step to generate methane gas to generation equipment to power the facility. A byproduct of the methane generation from organic materials is ammonia generation from urea and other organic nitrogen compounds in the effluent.

A problem with electrolytic base water treatment equipment is scale build up on electrode surface. As the treatment progresses, chemical fouling occurs due to oxidation reaction occurring at the anode and reduction reaction occurring at the cathode. The scale and fouling build up in the reactor requires higher current to maintain the same potential across the electrodes.

Electricity has been used for ages to cause electro-chemical reactions in the fluids. When current is passed through a solution using an anode and cathode separated by a finite distance, current, which is flow of electrons, flows through the solution. This induces redox chemical reactions at the anode and cathode as electrons are transferred to molecules and molecules are converted to ions in the solution and vice versa. Typically an EMF (electromotive force) source is used to send electricity through the solution and the current flowing through the solution is a function of the surface area of the electrode, distance between the anode and cathode, the potential difference applied, the nature of the electrodes and the nature of the medium through which the current is flowing. Efforts have been made in the past to pass as much current as possible to speed up the chemical reactions going on at the electrode surfaces by varying many of the above said factors. However, issues such as leakage current, cell efficiency over a prolonged period, precipitation of salts over electrodes, corrosion, scaling, mass transport limitations, durability and stability of electrodes have been some of the limitations that have been keeping the electrolysis costs prohibitively high.

The present disclosure addresses some of these issues in an attempt to bring down the costs of electrolysis in the context of waste water treatment such as frac water, flow back water etc.

SUMMARY OF THE DISCLOSURE

Generally, the present disclosure relates to recovering ammonia and urea from processed sewage water and industrial wastewater. The ammonia ion is concentrated in the cathode compartment of an electro-chemical cell. The pH of the cathode compartment can be maintained above 10 to convert ammonium ion to ammonia gas. Hardness salts precipitated on the cathode surface are removed by turbulence created by cavitation. Optional generation of bleach on an anode can be used to convert ammonia to nitrogen gas and an optional addition of ozone in the anode can be used to increase organic destruction rates. The present disclosure device can be used to sterilize the effluent using anode, cathode and hydrodynamic cavitation. The high turbulence in the reactor enhances the mass transfer efficiencies leading to efficient degradation of the ammonia in the wastewater.

To enhance the performance of the electro-oxidation process and to eliminate the scaling and fouling of the reactor, the following preferred approach can be used:
1) Providing for a high turbulence entry of the influent into the reactor;
2) Alternating the polarity of the electrode(s) at certain intervals; and/or
3) Subjecting the influent to hydrodynamic cavitation, which allows for high cavitation energy dissipation. The cavitation energy is utilized to breakdown the organic contaminants and hence aid in electro-oxidation process.

Preferably the present disclosure can include one or more reactors comprising a liquid containing vessel and one or more pairs of electrodes. The electrodes can be preferably coated with mixed oxides, Nobel metals and/or boron doped diamond electrodes. A power source for each reactor can be provided which supplies voltage and current to the electrodes. A controller can be provided for switching and regulating the voltage and current to the electrodes, such that the polarity of the electrodes can be reversed at controlled intervals.

The electrolysis of fluid takes place at the cathode and anode. At the cathode hydrogen gas can be liberated to generate a hydroxide group and raising the pH of the water locally. The formation of OH− radical at the cathode reacts with the organic and inorganic compounds and, thus, accelerates the oxidation reaction.

The polarity of the electrodes can be periodically reversed to mitigate electrode surface scaling.

Oxidant gas can be injected, preferably through a Venturi configuration, and mixed with the incoming influent. The influent mixed with the oxidant gas bubbles discharges into the reactor through one or multiple nozzles preferably arranged in a circular array. The array of nozzles directs the influent flow preferably into the center of the reactor where the high turbulence energy dissipation is achieved. The oxidant gas bubbles are subjected to pressure and velocity variation where they collapse causing the phenomenon called sonoluminescence.

The introduction of an oxidizing agent through the discharge nozzles into the reactor forms a cavitation of nano bubbles by hydrodynamic cavitation in a low-pressure zone. These nano gas bubbles collapse/implode as they pass through increase pressure zone(s). Collapsing of the cavitation bubbles may produce ultraviolet oxidation of organic substance in the fluid. The collapsing of the cavitation bubbles can create a high-energy condition like ultraviolet light, shearing, high pressure, heat, mechanical vibration, noise etc.

Electrolytically treating water through influent inlet arrangements for cavitation and one or more pairs of electrodes is disclosed. The electrodes can provide continuous anodic and cathodic operation for treating water. The pressurized influent premixed with oxidant gas can be pumped into the reactor vessel through the mixing nozzles arranged radially along the circumference. A power source for each reactor provides voltage and current to the electrodes. The controller maintains the voltage and current to the electrode. The duration of each voltage polarity applied to each electrode can be preferably the same. The polarity of the current to the electrode can be periodically reversed at a set interval.

Also disclosed is a novel electro catalytic paddle shaped electrode which has the capacity to carry very high current densities for prolonged periods. In one non-limiting embodiment of the present disclosure, the electrode can be an alternate arrangement of pentagonal plates of anodes and cathodes of specific dimensions and angles, separated from each other by a specific distance and having a specific, highly inert, non-conducing, material spacer in between them. Any number of these electrodes can be deployed in a tank or a reactor of any shape such as rectangular pipe reactor or cylindrical tank reactor or any other shaped reactor for that matter to achieve the desired degree of treatment such as precipitation or advanced oxidizing species generation.

In another non-limiting embodiment the distance between the alternate pentagonal plates of the electrode can be adjustable/variable and can be adjusted/tuned depending upon the load on the electrode in terms amount of precipitation needed or amount of oxidant species generation needed to achieve the desired treatment based upon the quality of the untreated influent fluid.

In still another non-limiting embodiment there are provided features on the surface of the electrode to enhance the turbulence and shear in the fluid as it passes over the preferred alternate pentagonal plates at high velocities. These features are of specific geometries and shapes and dimensions and can be arranged in a regular pattern or in a random pattern. The presence of these features reduce the boundary layer thickness in the fluid and increase the local velocity of the fluid and hence produce local micro-turbulence and eddies which helps in increasing the mass transport of ionic and molecular species between the alternate anodes and cathodes. This in turn helps increase the current flowing through the solution due to increased mass transport of ions and molecules in the solution which in turn enhances the rates of electro-chemical reactions occurring at anode and cathode tremendously.

In still another non-limiting embodiment the polarities of the pentagonal plates can be alternated at very high frequency using a proprietary electronic switching control mechanism. The polarities of the alternate pentagonal plates can be switched back and forth nearly at about 1000-20000 Hz. The duty cycle of this high frequency polarities switching of alternate pentagonal plates can be done for times ranging from about 30 minutes to 99 hrs. This feature of the novel electrode imparts the self cleaning abilities of the electrodes and hence removes some of the limitations of current state of the art such as scaling on electrodes, reduced current efficiency, corrosion and stability and durability of the electrode over prolonged time of operation. It also reduces the downtime in operation needed for manual cleaning of electrodes as is done in the current state of the art thus reducing the cost of operation and maintenance. An electronic control mechanism can control the ultra high frequency switching of polarities of the alternate pentagonal plates.

In still another non-limiting embodiment there can be provided a chemical coating of specific thickness can be applied on the alternate pentagonal plates. The presence of the coating assists the paddle electrode to sustain the ultra high frequency switching of polarities of the alternate plates of the novel paddle electrode at very high current flows ranging from about 200-2000 Amp or current densities ranging from about 0.1-1.0 Amp/cm$^2$, which provides for novel ultra high frequency switching of polarities of electrodes for sustained periods of time at high current flows without damaging the electrodes.

In still another non-limiting embodiment the coating acts as a catalyst for producing oxidizing species in the fluid thus further enhancing the amount of oxidizing species generated in the fluid in addition to the electrochemical reactions producing oxidizing species at the expense of electricity.

An electro-catalytic paddle electrode can be used for the treatment of flowback and produced water. The paddle electrode can consists of alternate pentagonal flat plate electrodes separated by adjustable variable distance Teflon spacers. The paddle electrode is provided with a chemical coating capable of switching/reversing the polarity of anodes and cathodes at ultra high frequencies under very high current flowing conditions thus making it more efficient, stable and durable under demanding field conditions.

BRIEF DESCRIPTION OF THE DRAWINGS

FIG. 11 is a perspective view of electro catalytic paddle electrode in accordance with the disclosure which shows the overall construction of the electro-catalytic paddle electrode. Preferably, the paddle electrode can consist of alternate arrangements of definitely shaped pentagonal flat plates which can be held together by insulator bolts;

FIG. 12 illustrates another view of the electro-catalytic paddle electrode showing the plate electrode, TEFLON® insulator, threaded insulator rod, TEFLON® insulator nut, metal spacers, rod anode, metal nut and threaded metal rod;

FIG. 13 shows an exploded view of the various components of the preferred electro-catalytic paddle electrode;

FIG. 14a shows a front view of how the electro-catalytic paddle electrode can be attached to a mounting plate;

FIG. 14b shows a perspective view of a convex irregular pentagonal electro-catalytic paddle electrode;

FIG. 15 shows how a number of novel electro-catalytic paddle electrodes can be placed on a cylindrical reactor and how it looks from outside in the front view;

FIG. 16 is a cutaway or sectional view showing how the novel electro-catalytic paddle electrodes look like when placed on the cylindrical reactor of FIG. 15 and seen from inside from the front side of the cylindrical reactor;

FIG. 17 shows how a number of novel electro-catalytic paddle electrodes can be placed on a rectangular reactor and how it looks from outside in the front view;

FIG. 18 is a cutaway or sectional view showing how the novel electro-catalytic paddle electrodes look like when placed on the rectangular reactor of FIG. 17 and seen from inside from the front side of the rectangular reactor;

FIG. 19 is side elevational view of a non-limiting pentagonal flat plat electrode in accordance with the disclosure; and FIGS. 20A, 20B, 20C and 20D illustrative perspective view of the pentagonal plate electrode in accordance with the disclosure and illustrating various features/protrusions disposed on the surface of the plate electrode.

DETAIL DESCRIPTION OF THE DISCLOSURE

Figure 1:
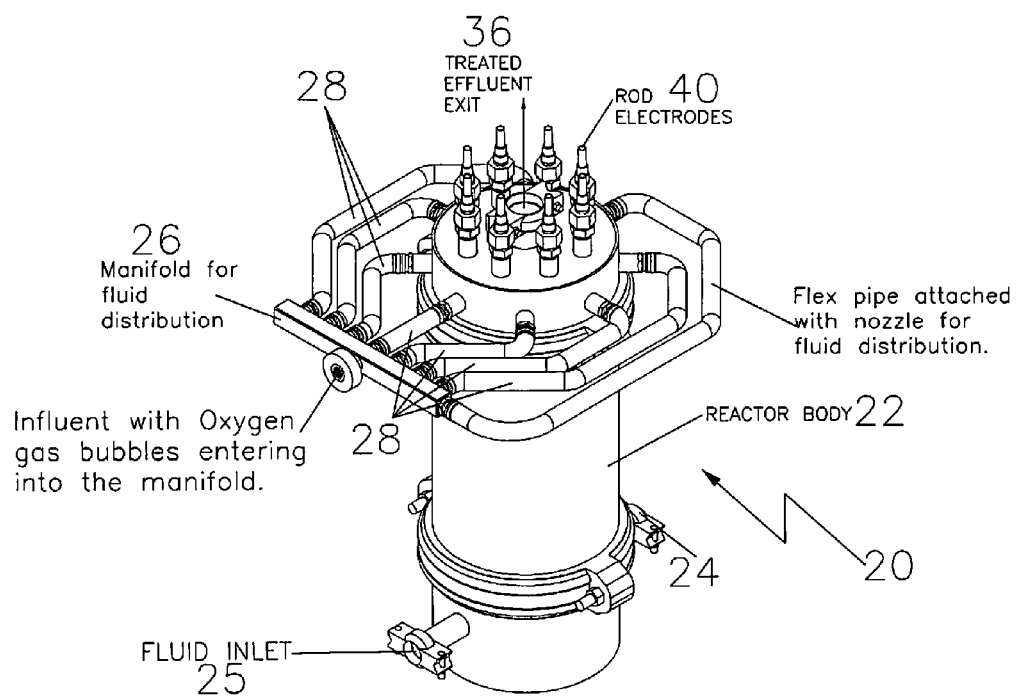
FIG. 1 is a perspective view of an Electro-chemical cell reactor showing various features in accordance with the disclosure.

As in FIG. 1 the Electro-chemical cell reactor in accordance with the present disclosure is shown and generally designated as electro-chemical cell reactor 20. Preferably, reactor 20 can be a pressure vessel with one or more electrodes 40 and a nozzle assembly attached or otherwise secured to it. Raw influent to be treated preferably enters from or near the bottom of the reactor body 22 such as, but not limited to, through a raw fluid inlet 24 and raw fluid outlet 25. An internal divider 27 can be provided within reactor body 22 for separating or isolating the raw fluid passageway area (bottom chamber) 29 preferably at the bottom of reactor body 22 and the treating area (top chamber) 30 within reactor body 22 from each other. Reactor body 22 can be preferably cylindrical in shape and can be installed vertically or horizontally depending on the layout of the system which electro-chemical cell reactor 20 is associated with or part of. A strainer screen or other type of filter can be disposed within bottom chamber 29 and/or at raw fluid inlet 24 and/or raw fluid outlet 25 to filter out bigger size particles before they reach booster pump 64.

As will be discussed with FIG. 2, after leaving raw fluid outlet 25 the raw fluid is preferably mixed with oxidant gas. The influent with mixed with oxidant gas is then pumped into a manifold 26. Manifold 26 is preferably on or near the top part of reactor body 22 and is used for fluid distribution. Multiple piping outlets 28 serve as inlets for the influent with mixed oxidant to direct the mixed oxidant influent into treating area 30 of reactor body 22 and facilitate the distribution of pressurized fluid into the reactor through the use of a nozzle 32 at the end of each piping outlet 28 which is in communication with treating area 30. The number of nozzles/piping outlets 28 is not considered limited to any particular number and varying number of nozzle/piping outlets 28 can be used and are considered within the scope of the disclosure.

One or more rod electrodes 40 can be installed and positioned within treating area 30 and in embodiment can be installed vertically from topside of reactor body 22. Preferably the anodes of rod electrodes 40 can be insulated through gland nuts and do not touch reactor body 22. Electrodes 40 can be connected to a single power supply 50 or multiple power supplies where their polarity can be preferably changed at certain fixed intervals.

An outlet pipe 36 can be substantially positioned within treating area 30 and can be preferably centrally or substantially centrally positioned with respect to reactor body 22 and serves as the discharge route or exit for the treated effluent.

Figure 2:
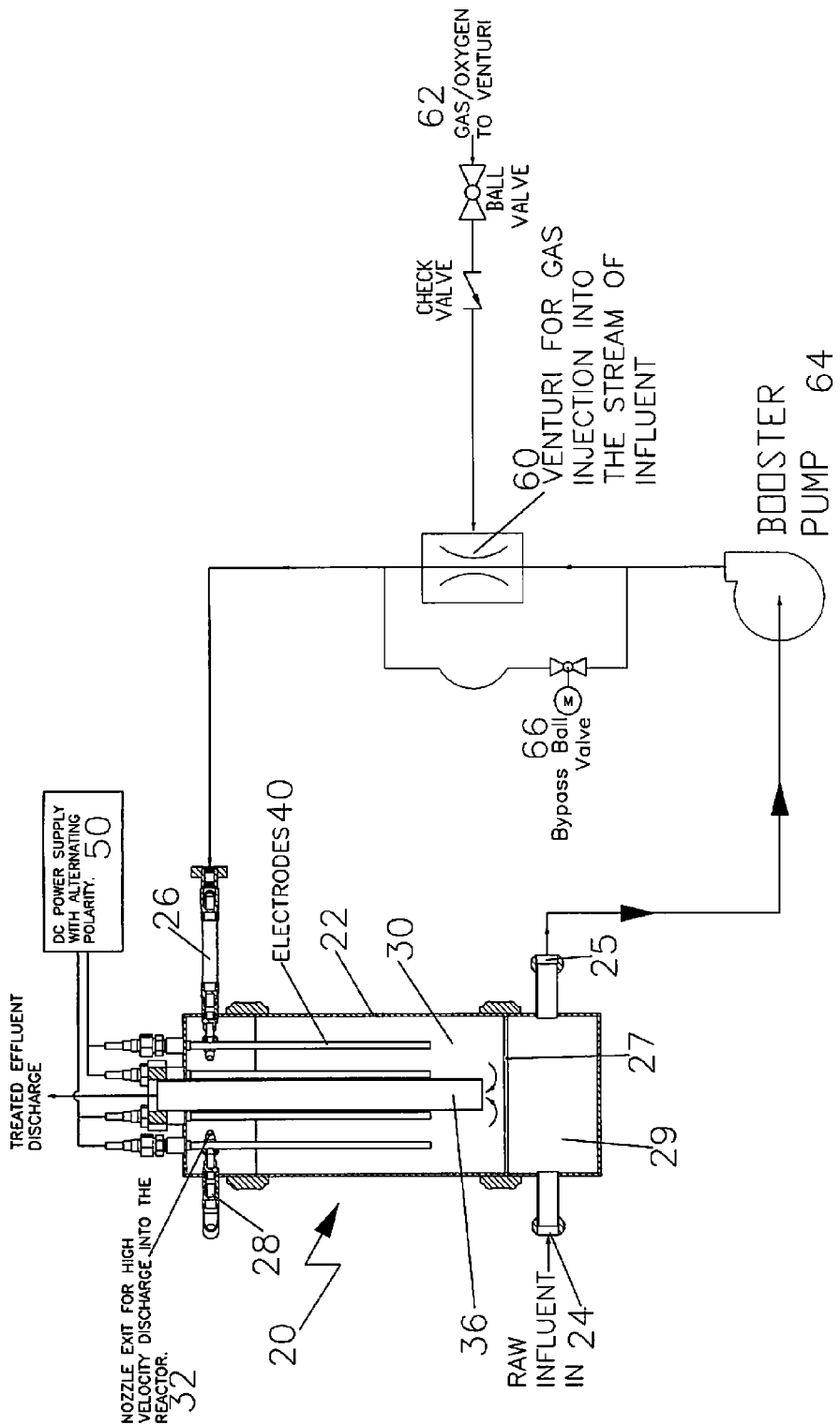
FIG. 2 illustrates a block diagram for a piping layout in accordance with the disclosure where the influent is mixed with the oxidant gas preferably using a venturi set up.

FIG. 2 illustrates the piping layout where the influent can be mixed with oxidant gas 62 preferably using a venturi 60 set up. A booster pump 64 can be provided to raise the pressure of the incoming influent and then passed the influent through the venturi. Bottom chamber 29 preferably receives the influent in and then passes the influent on to booster pump 64. If the incoming flow has a higher pressure flow, greater than the limitation of booster pump 64, pressure relief valves and a bypass line from bottom chamber 29 to reactor 20 can be provided to balance the flow of influent. In an alternative embodiment, bottom chamber 29 is eliminated and the raw fluid can be directly fed or diverted to booster pump 64 and/or venturi 60.

A bypass valve 66, preferably a ball valve, can be provided for maintaining the required pressure drop across the venturi for optimizing the highest possible mass transfer efficiency. The pressure difference across venturi 60 defines a vacuum and hence allows the volume of oxidant gas from gas source 62 that is required for the treatment injected into the stream of influent to be treated that is traveling through the system. The influent mixed with the oxidant gas can then be pumped or otherwise directed into manifold 26. Manifold 26, with its plurality of outlets 28/nozzles 32, can be provided to facilitate the distribution of the high-pressure oxidant gas mixed influent into treating area 30 of reactor body 30.

Figure 3:
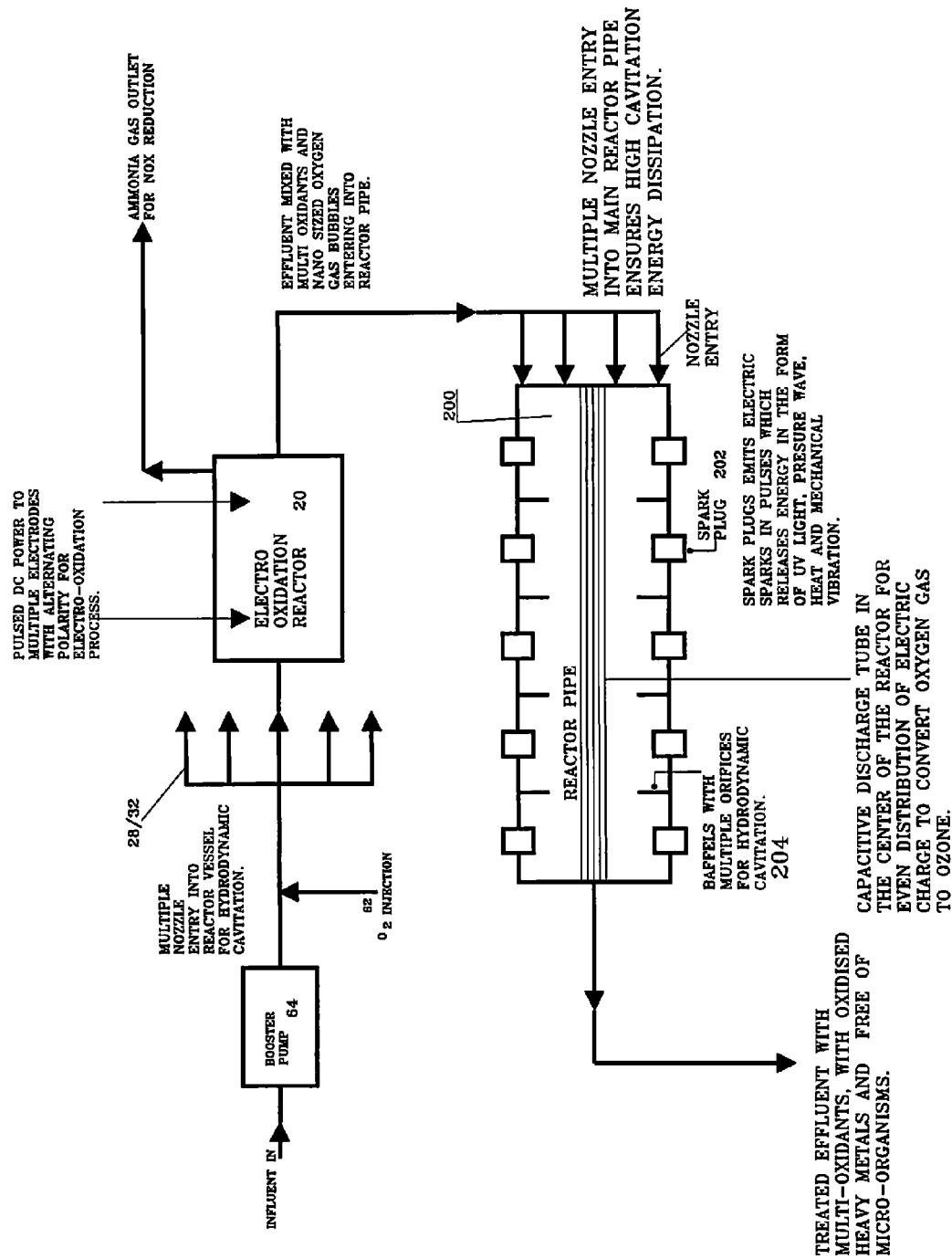
FIG. 3 illustrates a block diagram of water treatment apparatus using the disclosed Electrolytic cell and a reactor pipe with spark plugs.
Figure 4:
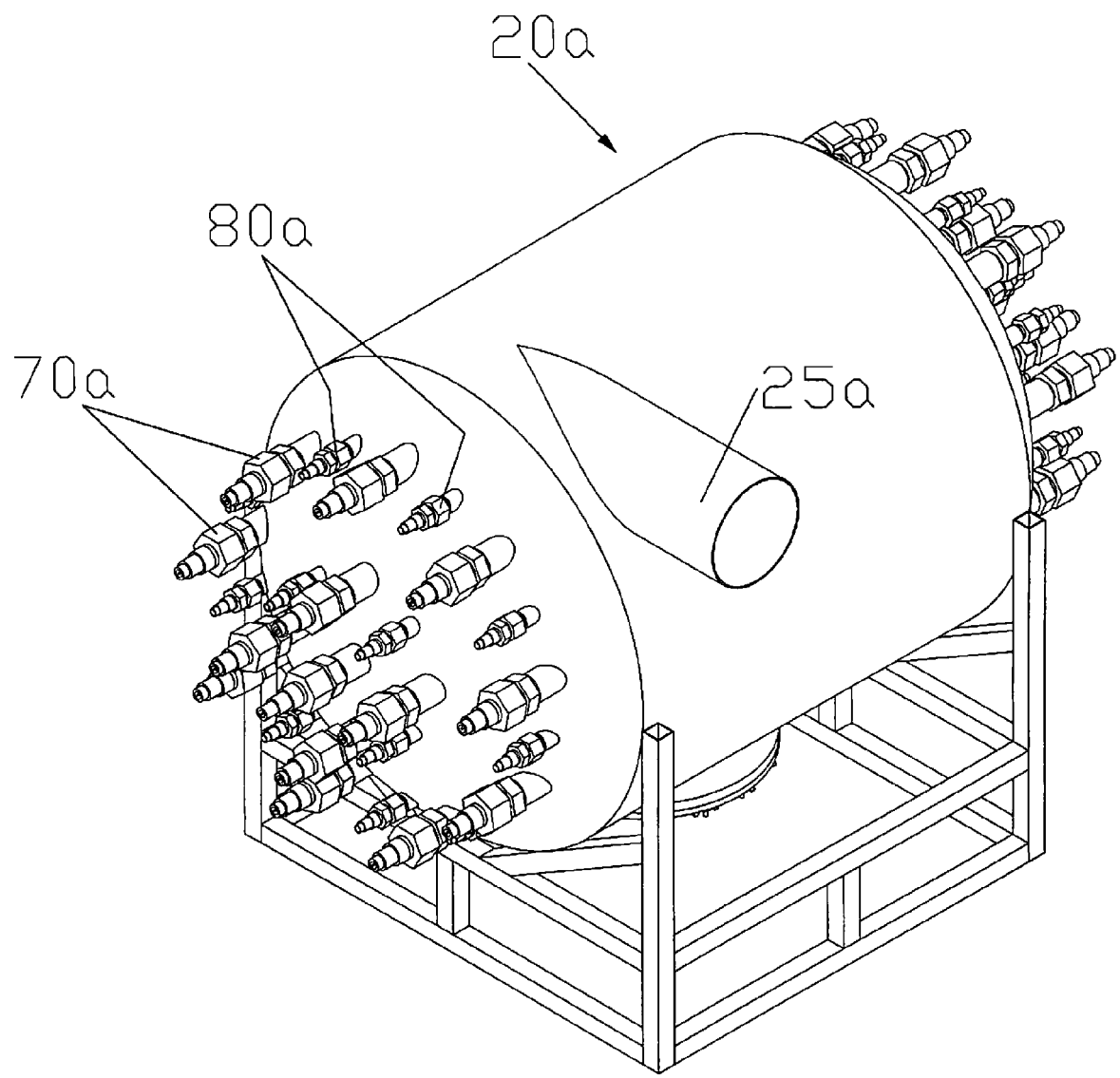
FIG. 4 illustrates a perspective view for another type of electrolytic cell configuration where the Capacitive Discharge tubes and rod anodes can be arranged in the circular manner in the chamber.
Figure 5:
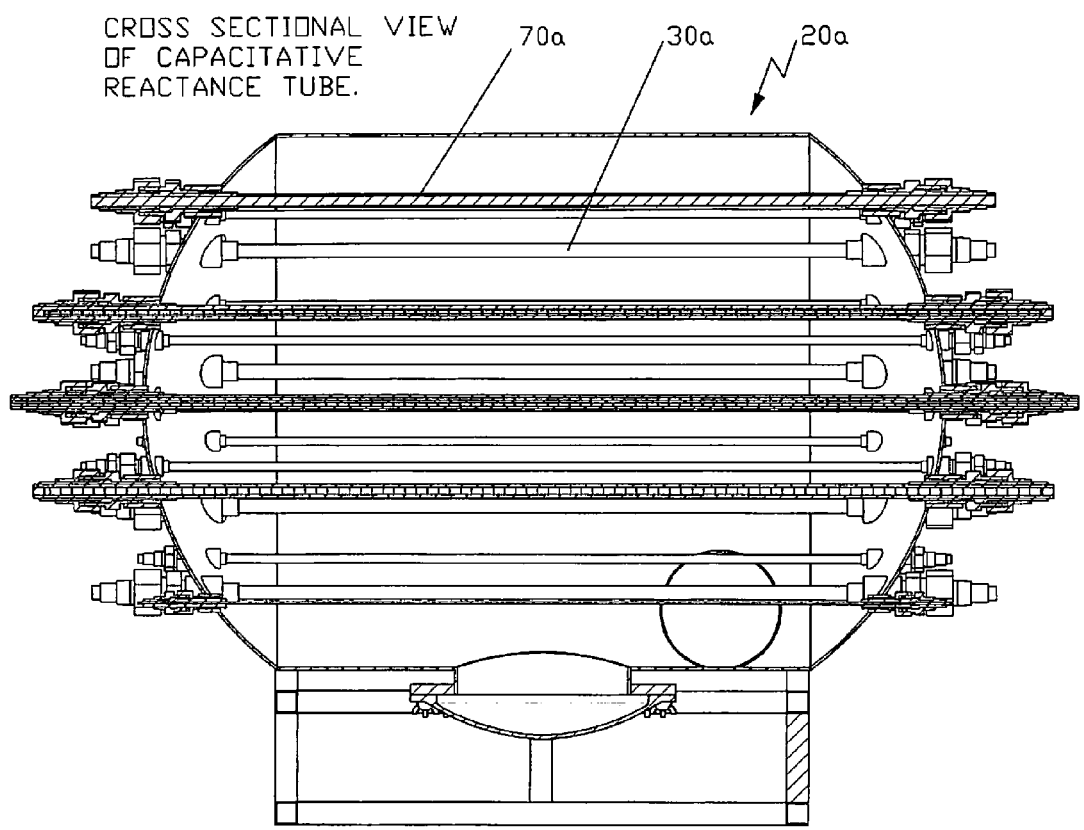
FIGS. 5 and 6 illustrate the front and top cross-sectional views, respectively, of the electrolytic cell showing one non-limiting arrangement of rod anodes and capacitive discharge tube in accordance with the disclosure.
Figure 6:
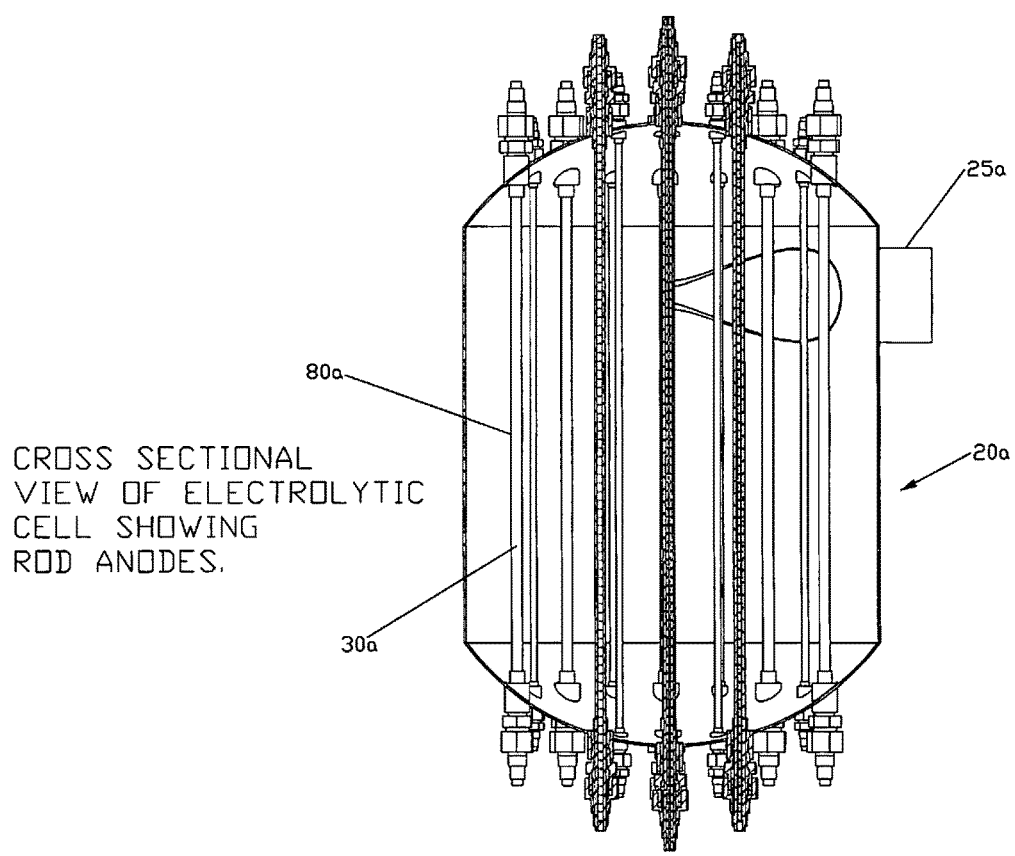
Figure 7:
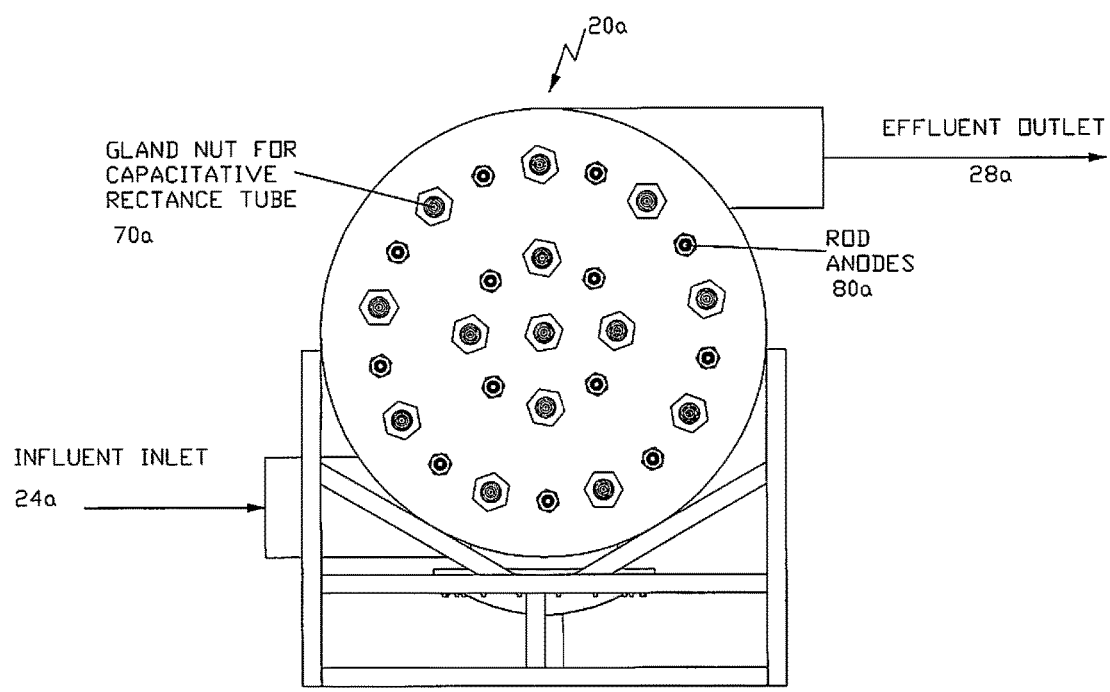
FIG. 7 illustrates a side elevational view of the disclosed electrolytic cell showing non-limiting locations for the influent inlet and effluent and also showing a non-limiting arrangement of rod anodes and high voltage capacitive discharge tube.

FIG. 3 illustrates a block diagram of water treatment apparatus incorporating electrolytic cell 20 and a reactor pipe 200 with spark plugs 202 which is discussed in more detail in our co-pending U.S. application Ser. No. 13/252, 198 filed Oct. 4, 2011, which is incorporated by reference in its entirety.

In use, influent can enter into the process through booster pump 64 where it can be preferably mixed with oxidant gas 62 e.g. ozone, oxygen etc. preferably using a venture 60 configuration. Influent intake can preferably be through booster pump 64. The influent pressure can be raised and processed through the system. A higher-pressure difference across the venturi creates the vacuum allowing oxidant gas 62 to mix well with the influent stream. Pressurized influent mixed with the oxidants can then be preferably discharged into treating area 30 of reactor 20 preferably through a series of piping 28/nozzles 32. The series of nozzles 32 can be preferably directed towards the center of reactor 20. As the influent, preferably mixed with the oxidant gas, is exited out of the nozzles, large cavitation energy dissipation occurs.

In connection with electrolytic reactor cell 20 electrodes 40 are preferably connected to DC power supply 50 where pulsed DC power supply 50 provides pulsed DC power into the water through one or more electrodes 40. The electro chemical oxidation using inert electrodes 40 can take place through two mechanisms: 1) direct oxidation where pollutant is destroyed at the anode surface; and 2) indirect oxidation where a mediator is electrochemically generated to carry out the oxidation.

The mass transfer from the bulk solution to the electrode surface takes place, and then homogenous or heterogeneous chemical reactions occur at the electrode surface. These reactions are followed by the electron transfer at the electrode surface. Finally, the mass transfer of electrons from the electrode surface to the bulk solution occurs.

The rate of the electron transfer is governed by the electrode activity and the current density whereas the extent of the mass transfer will be controlled by the turbulence in the reactor vessel. The ammonia gas release through electro-oxidation process can then be vented out to use for NOX reduction in exhaust fluent gases (See FIG. 3).

After that the effluent is pumped into reactor pipe 200 it can be passed through series of baffles 204. Baffles are primarily provided for two purposes: (1) to harness the potential energy of the pressure head and velocity into the hydrodynamic cavitation, and (2) for the efficient mixing of oxidant gas nano bubbles with the effluent. The pressure velocity relation of the flowing fluid is used to create the hydrodynamic cavitation. At each orifice hole in baffles 204, the kinetic energy of the liquid increases at the expense of the pressure head, causing the pressure around the orifices to drop below the threshold pressure for hydrodynamic cavitation. Subsequently as the liquid jet expands, the pressure increases resulting in the collapse of the gas bubbles. During the passage of the effluent through the multiple orifices, boundary layer separation occurs and high turbulent energy dissipation can be observed downstream.

Three prong spark plugs 202 can be installed on reactor pipe 200 for releasing a spark in the effluent using a pulse voltage generator. The pulse voltage generator with high voltage discharge is considered to overcome the die-electric resistance of the effluent. The pulse voltage generator establishes the sparks in the effluent and a gas solenoid valve synchronizes the pulsation and discharges the oxidant gas in the effluent. The gas bubble which can be trapped in the middle of the spark implodes and the oxidant gas nano bubbles are then converted into multiple oxidants like O3, OH–, HO2, H2O2 and O. These super oxidants are then utilized to oxidize the contaminants present in the effluent.

The UV light emitted by the spark plug in the effluent helps in the disinfection process and to sterilize the effluent. The preferred pulse mode of the spark in the effluent generates the sonic waves in the effluent. The subsequent compression and rarefaction cycle of the sound waves causes the bubbles to expand and collapse releasing large amount of energy in the form of heat, UV light, mechanical vibration, and shear. This form of energy can be utilized for oxidation and sterilization of the effluent. Preferably the pulse generator matches the frequency of the oxidant gas discharge into the effluent with the spark pulse generator. A compressed gas tank stores the gas for the process and acts as an accumulator.

FIGS. 4-7 illustrate another type of electrolytic cell 20a which can be used in accordance with the present disclosure. In this embodiment, capacitive reactance tubes 70a and rod anodes 80a can be provided and can be preferably arranged in a circular manner within the treating chamber 30a of electrolytic cell 20a. Preferably, influent enters radially from the bottom of electrolytic cell 20a through influent inlet 24a and exits from the top of electrolytic cell 20a through effluent outlet 25a. The preferred arrangement of capacitive reactance tubes 70a and rod anodes 80a is also illustrated in the Figures. However, such arrangement is not considered limiting.

Figure 8:
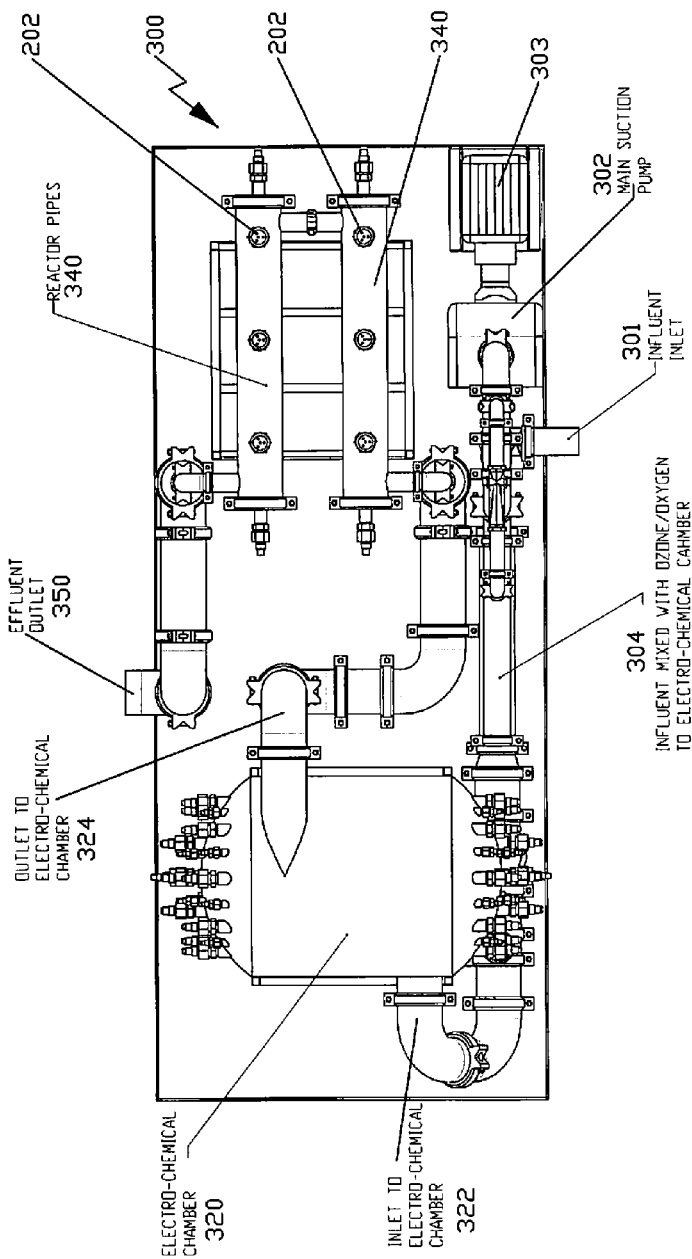
FIGS. 8-10 illustrate several views of an advanced oxidation configuration using an electro-chemical chamber in accordance with the disclosure and a reactor pipe.
Figure 9:
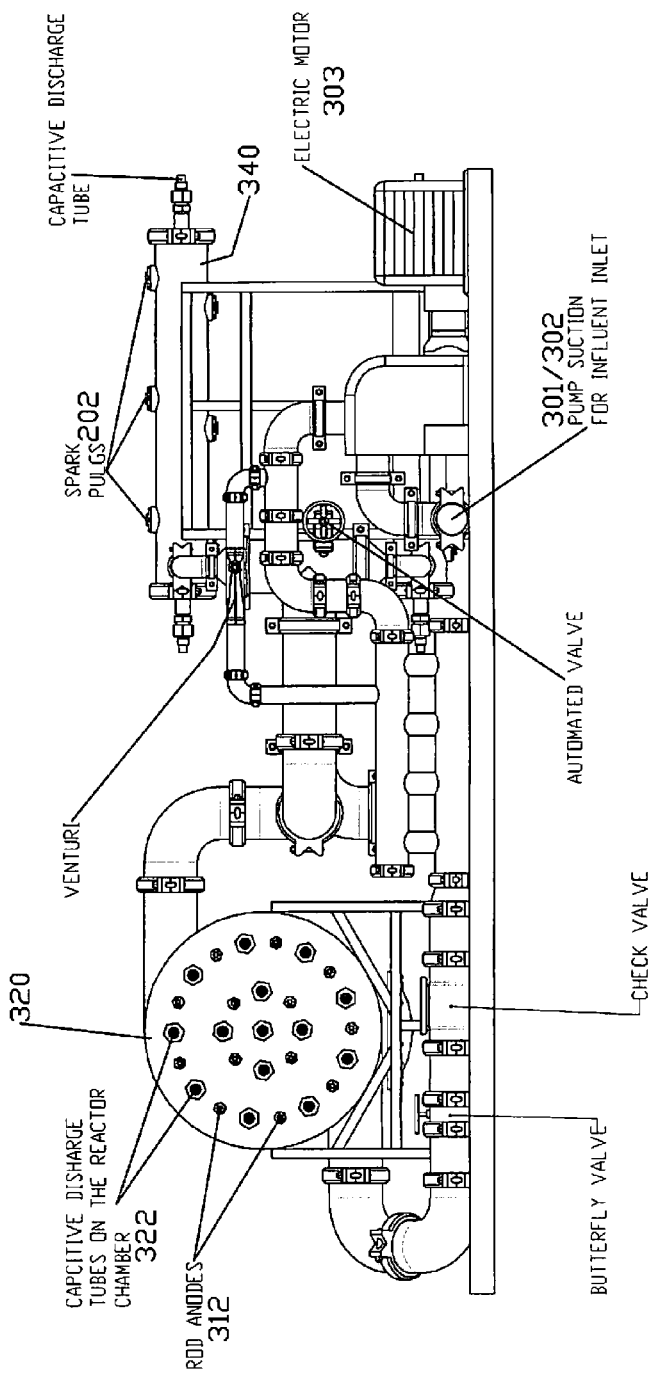
Figure 10:
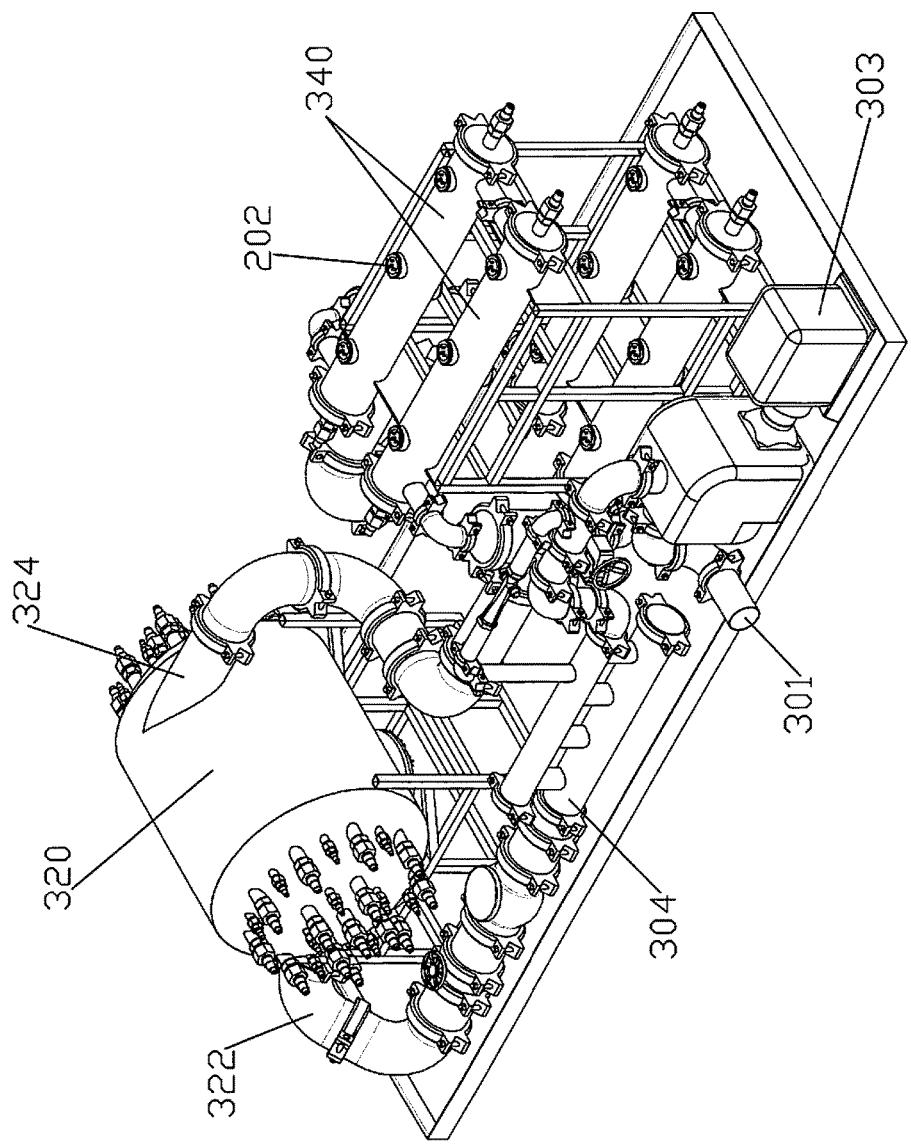
Figure 20A:
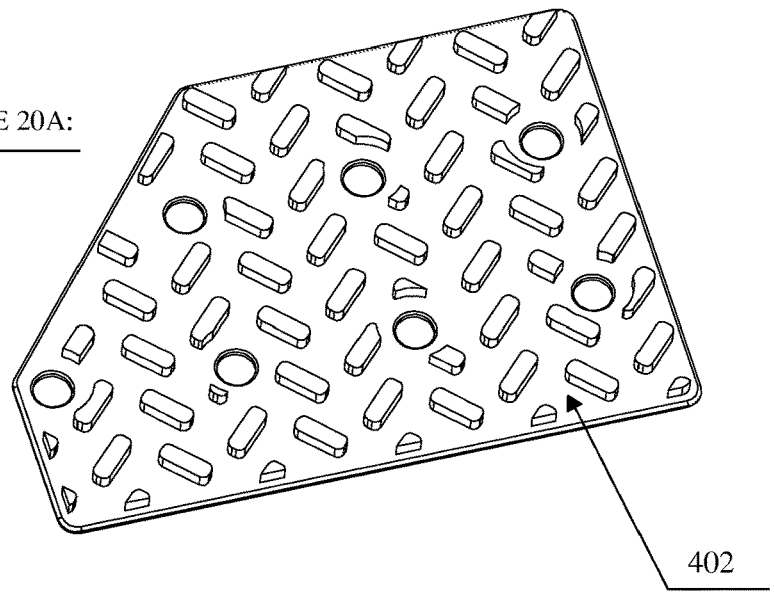
Figure 20B:
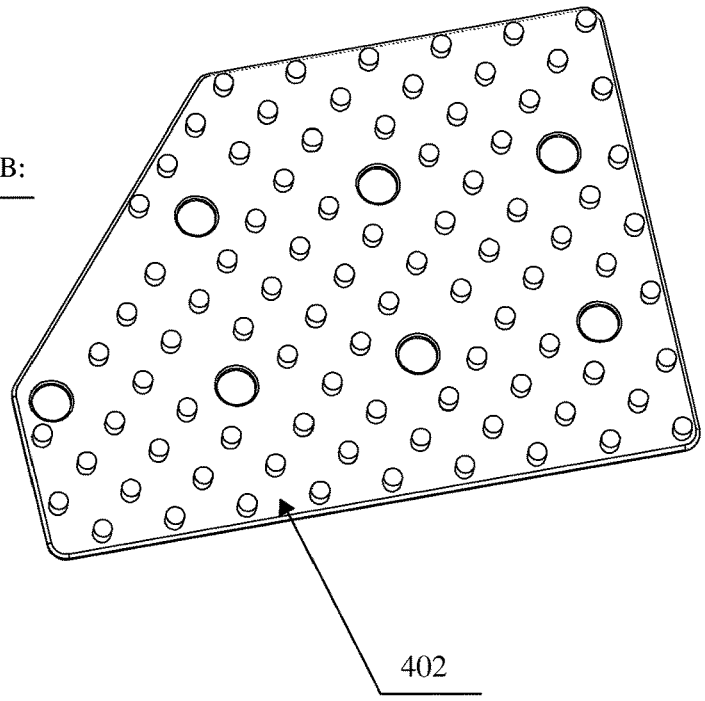
Figure 20:
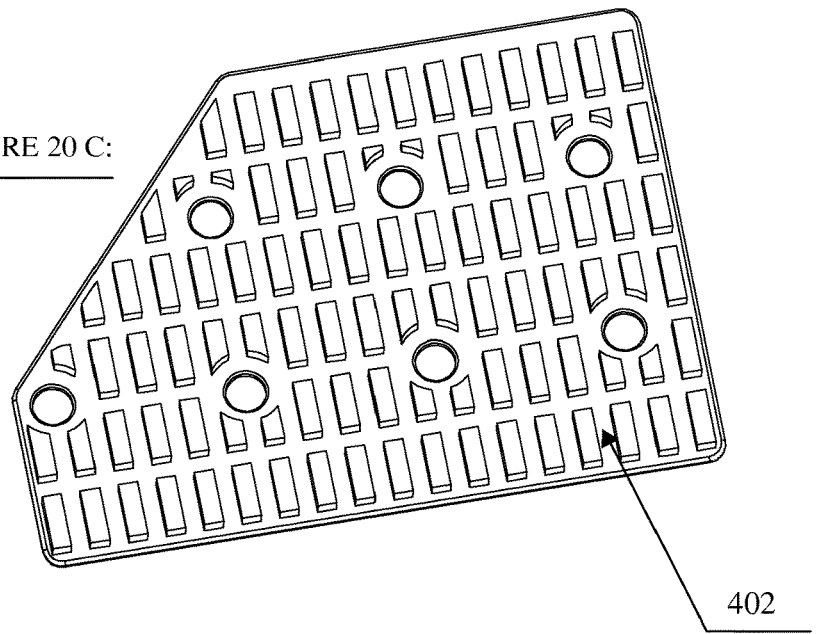
Figure 20:
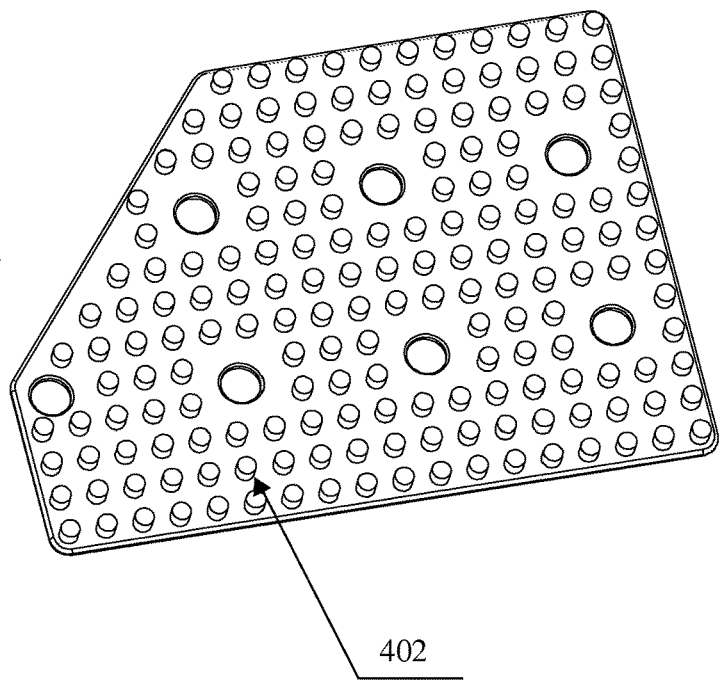

FIGS. 8-10 illustrate different views of an advanced oxidation process and system 300 using an electro-chemical chamber 20/20a and reactor pipe 200 in accordance with the teachings of the present disclosure.

Initially, influent enters into the system through inlet 301 in connection with main suction pump 302 and motor 303. The discharge main suction pump 302 is then preferably distributed into two streams, one through venturi and the other through a bypass line with automated valve. The automated bypass valve maintains the required pressure across the venturi for mixing the right amount of oxidant gas like ozone and oxygen into the stream of influent.

Influent mixed with Oxidant gas then discharged into main pipe 304 through multiple nozzles. These nozzles are meant to achieve highest possible cavitation energy dissipation in the main pipe. Nozzles are used to increase the velocity of effluent entering into main pipe. The higher exit velocity means higher Reynolds number and hence higher turbulence energy dissipation.

Advantages of using Nozzles include, but are not limited to:

1) Dynamic mixing under pressure yields greater mass transfer
2) Provides desirable backpressure to the venturi injector.
3) A larger dose of oxidant gas is possible.

As the Cavitation Energy dissipation allows the formation, growth and subsequent collapse of micro bubbles or cavities occurs in an extremely small interval of time (milliseconds) releasing large magnitudes of energy. The release of energy is over a very small pocket, and cavitation events occur at multiple locations simultaneously. The overall effects are generation of hot spots, release of highly reactive free radicals, continuous cleaning as well as increase in the surface area of the solid catalysts, and enhancement in the mass transfer rates.

The mechanism of cavitation phenomena has been mainly attributed to the mechanical effects viz. generation of turbulence, liquid circulation currents and shear stresses, supplemented by the chemical effects (generation of active free radicals) and heat effects (generation of local hot spots i.e. condition of very high temperature) These localized high energy conditions results in the formation of highly reactive free radicals facilitating the breakdown of the organic substances and can also result in the disinfection of microorganisms present in the effluent stream.

Effluent mixed with multi-oxidants then enters radially into the Electro-Chemical chamber through inlet 322. Electro-Chemical Chamber can consist of rod anodes 312 and capacitive discharge Tubes 332 similar to electrolytic cell 20a (FIGS. 4-7). Rod anodes 312 release DC current in the effluent. The electrodes can be coated with mixed oxides, Nobel metals and/or boron doped diamond electrodes.

The following reaction takes place at the cathode and anode:

(i) Reactions Expected at Cathode:

$$O3+H2O+e \rightarrow OH.+O2+OH-$$

$$O2+H2O+2e \rightarrow HO2-+OH-$$

$$O2+2H2O+2e \rightarrow H2O2+2OH-$$

(ii) Reactions Expected at Anode:

$$3OH^- \rightarrow HO_2^- + H_2O + 2e$$

$$OH^- \rightarrow OH + e$$

$$O_2 + 2OH^- \rightarrow O_3 + H_2O + 2e$$

$$2H_2O \rightarrow H_2O_2 + 2H^+ + 2e$$

$$O_2 + H_2O \rightarrow O_3 + 2H^+ + 2e$$

$$H_2O \rightarrow O + 2H^+ + 2e$$

The turbulent flow through system 300 aids in efficient electron migration between anode and cathode. These electrodes are non-active electrodes where the anode material acts as a catalyst and hydroxyl radicals that are generated at the electrode surface assist the oxidation process.

Preferably and as shown, there can be multiple capacitive discharge tubes 332 contained within Electro-chemical Chamber 320. Capacitive discharge tubes 332 preferably contain an outer quartz tube, which can withstand the hydraulic pressure of the effluent. In the center of the quartz tube can be housed a corona discharge electrode. The corona discharge electrode causes a transient high-pressure glow discharge. When a dielectric-barrier discharge is operated in a corona discharge electrode having rare gas (Xenon), plasma conditions in micro-discharge channels are formed and act as an intense source of Ultraviolet. As contaminants are subjected to the super oxidants in electro-chemical chamber 320, effluent is sterilized by oxidizing the colonies of the bacteria. Inorganic contaminants are oxidised to their inert form.

The capacitive discharge tubes 322 can be structured similar and operate similar to the capacitive discharge tube 80 described in our co-pending application Ser. No. 13/252,198 filed Oct. 4, 2011, which is incorporated by reference in its entirety.

Divalent cations which are very detrimental in forming scale are encouraged to precipitate by providing electrons and anions in the electro-chemical process. After precipitation these precipitated scale particles are chemically inert and remain in suspension.

After being treated within electrochemical chamber 320, effluent exits out of outlet 324 and can preferably be passed or directed through one or more, and preferably two sets of, reactor pipes 340. Each reactor pipe 340 can be similar to reactor pipe 200 discussed above and can contain a series of baffles and a plurality of spark plugs 202. Spark plugs 202 release high voltage pulse in the water, which in turn allows effluent saturated with oxygen, to produce ozone and hydroxyl radicals. These oxidants, which are produced, are then utilised to oxidise the contaminants.

The discharge from reactor pipe(s) 340 is coupled together to a common discharge line and ultimately exited out of system 300 through effluent outlet 350.

Certain non-limiting characteristics or features for certain components can include:

a. The rod anodes can be assembled in a circular array with spacing of about 2" to 4" between them.

b. The rod anodes can consist of a center electrode with a titanium base metal coated with mixed metal oxide coatings of thickness from about 10 to 100 microns. The coating on the rod can be mixed metal oxides of $IrO_2$ (about 1~40%); $RuO_2$ (about 1~40%); $TiO_2$ (about 1~20%) and Boron doped diamond electrode with (about 1~5%) diamond duct coated electrodes.

c. The electrode coating thickness range can be from about 10 micron to about 100 micron.

d. The rod preferably does not go to the bottom of the reactor to prevent short-circuiting of the electrodes.

e. The rod electrodes can be circular in cross section, to prevent fouling or catching and clogging up of the electrode area with sticky organic particles and fibers e.g. human hair and oily clay particles.

f. can have multiple circular nozzle array, with perpendicular entry, mixed with foam will generate random turbulence for efficient mixing of foam with effluent. Preferably no swirl motion is anticipated in the reactor.

g. Preferably, the nozzles are not installed for hydraulic cavitation, thus, preventing cavitation or pitting wear on the rod electrodes. The nozzles are used to create random turbulence to mixed OH radicals produced on the anode surface and hydro peroxyl radicals (HO2) on the cathode rod electrodes with the effluent to better treatment efficiency. The nozzle arrays can create random turbulence which is used to mixed foam, OH radicals, Hydro peroxyl with the effluent. The oxidation and reduction reactions can then be accelerated and the process efficiency is enhanced.

h. The Venturi exit pressure can be in the range of about 1 to 2 bar, and the foam bubble size can be from about 10 micron to 100 micron to ensure availability of effective surface area of the bubbles to react with organic compounds present in the effluent.

i. Generating about 5 to 50% quality foam in the effluent with the Venturi which can result in significant UV light transmittance in dark (dirty) or opaque water.

j. Low voltage DC power supply connected to Rod electrodes.

k. High Voltage Pulsed DC power supply can be connected to capacitive discharge tubes.

l. Metallic body of the reactor can be grounded to earth ground for safety and to prevent corrosion on the metallic surface.

m. DC power supply can go below about 2 VDC and can operate at the highest rated current; safety controls can automatically detect the high current and switch off the power supply.

n. Electrodes polarity can be reversed to prevent surface fouling or scaling. Electrode polarity can be reversed to also prevent delamination of mixed metal oxides coating on the electrode due to hydrogen embattlement.

o. Life of the electrodes can be increased between about 50 to 100% over continuous operation.

p. The capacitive discharge tube can contain a quartz tube with a central electrode. The quartz tube can contain a conductive gas between the quartz tube and electrodes. The metal electrode can be provided with multiple bristles for higher emissivity. The conductive gas can be Argon, Mercury vapor and hydrogen that helps to conduct the high voltage electricity through the quartz dielectric medium to the metal pipe. The high voltage can be applied though this medium causing a corona discharge established between the quartz tube and the electrode. Each individual spark can release energy in the form of UV light, heat, mechanical vibration. The UV light can break down the oxygen nano bubbles producing Ozone molecules, (OH−) Hydroxyl radicals. These oxidants intern can produce more multi oxidants, which can then be utilized to oxidize the contaminants in the influent. The power supply to the central corona discharge tube sweeps the frequency and voltage to find optimum ozone/UV output required for the process.

q. The capacitive discharge tube can consist of outer quartz tube with central electrodes with bristles to generate UV light which is then discharged into the fluid to treat fluid. The capacitive discharge electrodes can operate at pulsed high voltage DC power mode from about 1000 Hz to 212 KHz. The central electrode can have a positive polarity that makes outer quartz tube also positive polarity in the fluid. When using mercury vapor, UV light of about 194 nm to 252 nm can be generated in the capacitive discharge tube. When using Hydrogen gas, about 180 nm to 194 nm spectrum of UV light can be generated. The capacitive discharge tube can use a UV stabilized quartz tube to house the electrode in the center.

r. Preferably, one DC power supply having a polarity can be electrically connected with multiple rod electrodes, anode rods and cathodes rod returns. High Voltage DC pulsed power supply can be preferably connected to the capacitive discharge tubes.

s. The UV light generated from capacitive discharge tube can be used to make (OH) Hydroxyl radicals from the oxygen foam present in the effluent in the reactor. The UV light spectrum between about 180 nm to 260 nm can be produced by the capacitive discharge tubes and can be used to produced hydroperoxyl radicals on the cathode surface.

t. The capacitive discharge tube can also produce UV light spectrum between wavelength about 245 nm to 265 nm, which is used to activate chlorine and chlorine dioxide radicals. The UV light spectrum of wavelength about 180 nm to 265 nm catalyze the oxidation of organic matter with oxygen foam.

u. The nozzles can be preferably pointed to the center of the reactor in a circular array in order to generate stable oxygen foam with random turbulence. With randomly generated turbulence by nozzle arrays, the oxidants generated by the rod electrodes and the oxidants generated by the capacitive discharge tube can be mixed uniformly with effluent thus enhancing the oxidation efficiency. The nozzles can be located at the top of the reactor or at one end of the reactor while the fluid exit can be at the bottom or at other end. This arrangement helps to ensure removal of sediments and solid precipitants generated by the oxidation and reduction reaction in the reactor.

w. Venturi and gas injection preferably makes bubble size of about 10 to 100 micron. The Venturi exit pressure can be about 1 to 2 bar. The concentration of oxygen in the gas can be between about 70% to 99%. Gases including, but not limited to, ClO2, Oxygen can be used in the process. Oxygen gas doped with CO2 can be used to adjust the pH between about 6.5 to 7.2.

x. By periodic reversing polarity of the electrodes, hydrogen embrittlement of the electrode coating can be prevented and delamination of coating under cathode charge can be prevented. By also reversing the polarity, the life of the electrodes can be enhanced by about 50% to 100%. Scaling caused by precipitation of minerals on the negatively charged electrodes will separate from the coating in the effluent flow during self cleaning cycle of reversing polarity.

y. The preferred plurality of capacitive discharge tubes and rod electrodes can be arranged in alternate and circular array. There can also be multiple circular arrays depending on the diameter of the reactor. The spacing between the rod electrodes and capacitive discharge tube can be between about 2" to 6". The distance between each circular array can be between about 2" to 6". The outer metallic shell of the reactor can be grounded electrically for safety reasons from the rod electrodes and capacitive discharge tubes.

z. The rod electrodes can be insulated from the metallic reactor using insulators, such as, but not limited to, tubular insulators preferably having a thickness of about ⅛" to ½%" in thickness and about 2" to 6" in tube length. Similarly, the cathode discharge tube can also be insulated from the metal reactor, thus, preventing it from a direct electrical short.

Certain further features, benefits and/or advantages of the present disclosure, include, but are not limited to the following:

1. An electro-chemical reactor to removed organic contamination and hardness from aqueous solutions using:
   (a) an aqueous foam generator for creating micro sized bubbles from oxygen and ozone gases at foam qualities between about 10 and about 30 percent;
   (b) Rod anodes with Platinum, DSA (Dimensionally stable anodes (Electrodes)), or boron doped diamond with a metal walled vessel for cathode current return;
   (c) Capacitate discharge tube lamps containing mercury or deuterium vapor for pulsed UVC light generation;
   (d) a resident time between one and three minutes to complete oxidation and precipitation reactions.

2. Using the apparatus in benefit 1, oxidizing recalerent organic compounds using a pulsed discharge electrode in oxygen foam with:
   (a) Voltage exceeding about 50 kV,
   (b) Discharge cathode surround by oxygen gas envelope in aqueous solution,
   (c) At least two return anodes to cycle discharge pluses.

FIGS. 11 through 20 illustrate a paddle electrode assembly In one non-limiting embodiment an alternate arrangement of electrodes of pentagonal shaped flat plates of definite lengths and angles can be provided and shown in alternate arrangement in FIG. 11. A preferred, non-limiting, shape for the plate electrode is shown in FIG. 19. The preferred pentagonal shape of the plates is different than a conventional regular pentagon. The disclosed pentagonal shape can be a specific convex irregular pentagon with definite lengths of sides AB, BC, CD, DE and AE (See FIG. 19). The plate is further specific in the sense that the angles C and D can be preferably 135° and all other angles such angles A, B and E can be preferably 90°. Lengths of various sides can be varied to increase or decrease the surface area of the plate, with angles A, B and E preferably maintained at 90° and angles C and D preferably maintained at 135 degrees.

In another non-limiting embodiment, the alternate convex irregular pentagonal shaped plates can have features or protrusions cast on them to improve the turbulence and shear at high velocities of fluid flow over the electrodes (See FIGS. 20a-20d). These features can be arranged in a regular pattern or in random manner. The size of these features can range from just above 0 mm to about 5 mm×about 5 mm×about 5 mm. A zero measurement results in a flat plate, while when the measurement is above zero it produce one the non-limiting features on the plate. The spacing between these features (protrusions) can range from about 0.2 inch to about 0.5 inch to about 1 inch and as many features as can be accommodated on the plate without disturbing other features can be provided, though such is not considered limiting. As the fluid velocity over the featured plate electrodes increases, microturbulance and micro eddies are produced in the vicinity of the electrodes and in between the alternate plates of the electrodes which improve the mass transfer of oxidative and reductive species in the bulk of the medium as well as current flowing through the medium. This in turn increases the rates of oxidation and reduction of various unwanted species in the untreated fluid increasing the overall efficiency of the electro-oxidation system.

In another non-limiting embodiment, the alternate plates can be separated from each other by a certain distance X (See FIG. 14a). This distance X can be varied depending upon the load of the fluid in terms of total dissolved solids ("TDS") values and the application at hand. For example, this distance can be reduced to a few millimeter (about 5-10) in very low TDS fluid such as, but not limited to, about 500 ppm TDS water or this distance X can be increased to larger values such as, but not limited to, about 10-50 millimeter in high TDS fluid such as, but not limited to, about 30000 ppm TDS water. The electrostatic force (F) between the two charged plates with charges Q1 and Q2 separated by a distance X is given by $F=(Q1*Q2)/(K*X^2)$ where K depends upon the nature of the fluid medium. The strength of electric current is defined by the rate at which an electric charge moves along a conductor and through the medium. Thus the current flowing through the system depends upon the distance X between the plates as well as the nature of fluid medium under treatment and hence the distance can be adjusted to respond to the varying nature of the medium under treatment to achieve optimum conditions of flow of electric charges to maximize oxidizing species production for complete treatment of fluid under consideration. The fluid under consideration may be Flow Back Produced Water from oil and gas production fields, H2S/Mercaptan Contaminated water treatment from refineries, Hospital Waste Water or Municipal waste water.

In still another non-limiting embodiment, the alternate plates of the pentagonal shaped electrocatalytic electrode can be separated by distance X using spacers preferably constructed from highly inert nonconducting insulator material such as, but not limited to, corona resistant teflon (polytetrafluoro ethylene, PTFE). PTFE provides for an almost universal chemical inertness; complete insolubility in all known solvents below 300° C.; excellent thermal stability, and unsurpassed electrical properties, including low dielectric loss, low dielectric constant and high dielectric strength. Furthermore, PTFE does not embrittle at very high or at very low temperatures. Corona Resistant PTFE is a corona resistant form of PTFE. It is a homogeneous insulation having essentially all of the properties of pure PTFE, but having approximately a thousand-fold longer high-voltage life. Corona Resistant PTFE is unique among high voltage insulations in its excellent resistance to electro-mechanical and chemical-mechanical stress cracking.

These spacers 406 can be arranged as shown in FIG. 12 and in exploded view in FIG. 13. Two sets of three pentagonal flat plate electrodes 402 can be held together with threaded insulator TEFLON® rods 410. TEFLON® insulator spacers 406 maintain the distance between plate electrodes 402. Plate electrodes can be held on insulator rods 410 with the help of insulator nuts 414. Two plate electrode assemblies can be connected to separate rod anodes/cathodes 426. Each of the preferred three plate electrodes 402 can be connected to rod anode/cathode 426 through metal threaded rod 438 and metal nuts 430. The distance between the two rod anode/cathodes 426 is maintained by metal spacers 418 and 422. In this preferred arrangement two distinctive sets of electrode assemblies can be held together with insulators and metal threaded rods. In this way, electrode plates 402 can be connected to different polarity (positive and negative) of a DC power supply. Insulator spacer 406 maintains the distance between each electrode plate 402 and can be varied to a desired distance by changing the dimensions of spacer 406. In one non-limiting configuration, the distance between the electrode plates 402 can range from about 0.5"-2" or more. This preferred close proximity of the positively charged and negatively charged electrode plates 402 on the paddle electrode enhances the overall electrolysis process efficiency.

In still another non-limiting embodiment, the polarity of the alternate pentagonal plates 402 can be switched (positive become negative and negative becomes positive or anode becomes cathode and cathode becomes anode) at ultra high frequencies of about 1 kHz-20 kHz, even at very high current flows of about 2000 Amperes. The switching frequency controlled by an electronic control mechanism can depend upon the load on the electrodes in terms of TDS of the untreated fluid under consideration. The higher the TDS value of the fluid under treatment, the higher the switching frequency and the lower the TDS of the fluid under consideration, the lower the switching frequency needed. As a non-limiting examples, a switching frequency of 100 Hz may be needed at 500 ppm TDS whereas a frequency of 1000 Hz may be needed at 30000 ppm TDS and 20000 Hz may be needed at 80-100,000 ppm TDS.

As mentioned above, each paddle electrode assembly rod anodes/cathodes can be connected to a DC power supply positive and negative polarity outlet. The DC power supply has the ability to reverse the polarity of the power supply at a set frequency desired by the operator/controller. A human machine interface (HMI) screen and user interface can provides the ability to set and control the frequency to change the electrodes polarity. During this change of reversing polarity, each set of electrode plates (1) will become either anode or cathode. An electronic control mechanism can be designed to switch the polarity of anodes and cathodes at such ultra high frequencies of about 1 kHz-20 kHz under very high current flowing conditions of about 2000 amperes. This ability of being able to switch the polarities of the electrodes at ultra high frequencies provides the self cleaning capability of the novel pentagonal electrocatalytic paddle electrode which allows the reactor to remain clean by preventing any scale build up on the reactor or on the electrode. This in turn improves the current flowing efficiency of the electrodes for longer duration which means more efficient electro-oxidation and reduction reactions which in turn means higher redox potential and higher efficiency of the whole system.

In still another non-limiting embodiment, the featured plate electrodes can be coated with about 10-100 μm thick chemical layer consisting of Iridium Oxide, Ruthenium Oxide, Titanium Dioxide, and Platinum Oxide mixed and reacted in definite proportions at high temperature preferably in the presence of conductive PCD (polycrystalline diamond). The coating can be applied to the electrodes to be able to withstand the ultra high frequency switching of the polarities at very high current flowing capacities of about 2000 Amperes. The electrodes that are not coated with this coating may not withstand the ultra high frequency switching and their performance can deteriorate within a very short period of operation. Due to application of these coatings, the novel electrocatalytic paddle electrode has shown stable performance for long durations of operation in the field trials. In addition, these chemicals can also act as catalysts to further promote the oxidizing and reducing species formation in addition to electrochemical reactions caused by the flow of electrons through the medium such as OH., $O_3$, O, $H_2O_2$, $HO_2$, $Cl_2$, hypochlorous acid (HOCl), hypochlorite anion ($ClO^-$), chlorite ($ClO_2^-$), chlorine dioxide ($ClO_2$) peroxodisulfate ($S_2O_8^{2-}$), Ferrate ($FeO_4^{2-}$), peroxycarbonate ($C_2O_6^{2-}$) and permanganate ($MnO_4^-$), Chorate ($ClO_3^-$) and perchlorate ($ClO_4^-$) etc. Table 1 and 2 shows the calculated amounts of the oxidizing species formed by individual paddle electrode at 500 ppm and 30000 ppm TDS (total dissolved solids) in untreated produced flow back water respectively.

TABLE 1

Calculated rate of production of oxidizing species @ 500 ppm TDS untreated produced water at various current efficiencies of the individual novel paddle electrode

| | Maximum Rate of formation (mg/L · sec) | | | | |
|---|---|---|---|---|---|
| Oxidizing Species | $\eta = 100\%$ | $\eta = 80\%$ | $\eta = 60\%$ | $\eta = 40\%$ | $\eta = 20\%$ |
| OH* | 7.315E−01 | 5.852E−01 | 4.389E−01 | 2.926E−01 | 1.463E−01 |
| HO2− | 6.876E−01 | 5.501E−01 | 4.126E−01 | 2.751E−01 | 1.375E−01 |
| H2O2 | 6.892E−01 | 5.514E−01 | 4.135E−01 | 2.757E−01 | 1.378E−01 |
| O3 | 6.571E−01 | 5.257E−01 | 3.942E−01 | 2.628E−01 | 1.314E−01 |
| O | 1.032E−01 | 8.252E−02 | 6.189E−02 | 4.126E−02 | 2.063E−02 |

TABLE 2

Calculated rate of production of oxidizing species @ 30000 ppm TDS untreated produced water at various current efficiencies of the individual novel paddle electrode

| | Maximum Rate of formation (mg · L$^{-1}$sec$^{-1}$) | | | | |
|---|---|---|---|---|---|
| Oxidizing Species | $\eta = 100\%$ | $\eta = 80\%$ | $\eta = 60\%$ | $\eta = 40\%$ | $\eta = 20\%$ |
| OH* | 4.587E+00 | 3.670E+00 | 2.752E+00 | 1.835E+00 | 9.174E−01 |
| HO2− | 4.277E+00 | 3.421E+00 | 2.566E+00 | 1.711E+00 | 8.554E−01 |
| H2O2 | 4.323E+00 | 3.458E+00 | 2.594E+00 | 1.729E+00 | 8.645E−01 |
| O3 | 2.556E+00 | 2.045E+00 | 1.534E+00 | 1.023E+00 | 5.113E−01 |
| O | 4.013E−01 | 3.210E−01 | 2.408E−01 | 1.605E−01 | 8.025E−02 |
| Cl2 | 1.934E+00 | 1.547E+00 | 1.161E+00 | 7.737E−01 | 3.869E−01 |
| ClO2 | 6.092E−01 | 4.874E−01 | 3.655E−01 | 2.437E−01 | 1.218E−01 |
| HOCl | 1.417E+00 | 1.133E+00 | 8.499E−01 | 5.666E−01 | 2.833E−01 |
| HClO2 | 8.122E−01 | 6.497E−01 | 4.873E−01 | 3.249E−01 | 1.624E−01 |
| ClO— | 1.464E+00 | 1.171E+00 | 8.785E−01 | 5.857E−01 | 2.928E−01 |
| Fe2+ | 1.174E+01 | 9.394E+00 | 7.045E+00 | 4.697E+00 | 2.348E+00 |
| FeO4−− | 1.870E+00 | 1.496E+00 | 1.122E+00 | 7.481E−01 | 3.741E−01 |
| S2O8−− | 1.021E+01 | 8.167E+00 | 6.126E+00 | 4.084E+00 | 2.042E+00 |
| C2O6−− | 3.159E+00 | 2.527E+00 | 1.895E+00 | 1.263E+00 | 6.317E−01 |
| MnO4−− | 1.073E+00 | 8.587E−01 | 6.440E−01 | 4.293E−01 | 2.147E−01 |

As shown in FIGS. 15 and 17, any numbers of these novel electro-catalytic paddle electrodes can be deployed in either a cylindrical 500 or a rectangular 600 reactor to fulfill the power requirement of the fluid under consideration depending upon the TDS values, the flow rates, the capacity of the reactor, the residence time needed in the reactor and the degree of treatment as desired by the customer in the field. FIGS. 16 and 17 show the internal view of the paddle electrode assemblies deployed on cylindrical 500 and rectangular 600 treatment reactors, respectively. Thus the fluid to be treated enters the reactor in some way and flows over the desired number of novel electro-catalytic paddle electrodes 402 and the treated fluid comes out of the reactor 500 or 600, or another reactor or cell reactor. As the untreated fluid flows over the paddle electrodes many electro-chemical reactions such as precipitation of dissolved salts, formation of highly reactive oxidizing and reducing species or radicals and molecules take place at the electrodes and in the bulk of the fluid which removes the undesired constituents of the untreated fluid and converts the untreated fluid into treated fluid.

All locations, sizes, shapes, measurements, amounts, angles, voltages, frequencies, component or part locations, configurations, temperatures, weights, dimensions, values, percentages, materials, orientations, etc. discussed above or shown in the drawings are merely by way of example and are not considered limiting and other locations, sizes, shapes, measurements, amounts, angles, voltages, frequencies, component or part locations, configurations, temperatures, weights, dimensions, values, percentages, materials, orientations etc. can be chosen and used and all are considered within the scope of the disclosure.

Dimensions of certain parts as shown in the drawings may have been modified and/or exaggerated for the purpose of clarity of illustration and are not considered limiting.

Unless feature(s), part(s), component(s), characteristic(s) or function(s) described in the specification or shown in the drawings for a claim element, claim step or claim term specifically appear in the claim with the claim element, claim step or claim term, then the inventor does not considered such feature(s), part(s), component(s), characteristic(s) or function(s) to be included for the claim element, claim step or claim term in the claim for examination purposes and when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

In the above description, numerous specific details are set forth in order to provide a thorough understanding of the present arrangements and teachings. It will be apparent, however, to one skilled in the art that the present arrangements and teachings may be practiced without limitation to some or all of these specific details.

Although illustrative embodiments of the present teachings and arrangements have been shown and described, other modifications, changes, and substitutions are intended. Accordingly, it is appropriate that the appended claims be construed broadly and in a manner consistent with the scope of the disclosure, as set forth in the following claims.

While the disclosure has been described in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A electro-catalytic paddle electrode assembly disposed within a tank or reactor for creating hydroxyl radicals for treatment of a fluid traveling through the tank or reactor, the tank or reactor having an internal treating area and having a plurality of inlet nozzles with each of the plurality of inlet nozzles disposed at an end of an associated one piping outlet of a plurality of piping outlets, wherein the plurality of piping outlets serving as inlets for influent water into the tank or reactor, comprising:
a plurality of flat plate electrodes, each plate electrode having a short side and a long side, wherein the plurality of plate electrodes arranged in a pattern where the short side of adjacent flat plate electrodes of the plurality of flat plate electrodes alternate from being either disposed in a lower position or an upper position and such that there is an equal number of plate electrodes in a lower position as compared to a number of plate electrodes in an upper position, each flat plate electrode of the plurality of flat plate electrodes having its short side located at a same first end as all other flat plate electrodes of the plurality of flat plate electrodes regardless of whether the short side is in the upper position or the lower position, each of the plurality of flat plate electrodes having a plurality of apertures therethrough with a first aperture of the plurality of apertures being located at the short side of the flat plate electrode and a second aperture of the plurality of apertures being located at the long side of the flat plate electrode, each flat plate electrode having a same number of apertures and having a same shape as the other flat plate electrodes of the plurality of flat plate electrodes;
a plurality of insulated rods, each rod of the plurality of insulated rods inserted through a corresponding one of the apertures of the flat plate electrodes for holding the plurality of flat plate electrodes together;
a plurality of insulator spacers, each of the plurality of insulated spacers having an internal passageway, wherein a rod of the plurality of insulated rods is inserted through the internal passageway of an insulated spacer such that the plurality of insulated spacers are disposed on a corresponding rod and are disposed between adjacent plate electrodes being held together by the plurality of insulated rods for separating the plate electrodes from each other;
a pair of metal rods, a first of the pair of metal rods inserted through the first apertures of the flat plate electrodes having the short side in the lower position and a second of the pair of metal rods inserted through the first aperture of the flat plate electrodes having the short side in the upper position; and
a pair of anode/cathode rods, a first of the pair of anode/cathode rods connected at a first end directly to the first of the pair of metal rods and a second of the pair of anode/cathode rods connected at a first end directly to the second of the pair of metal rods such that the first anode/cathode rod is electrically connected to the flat plate electrodes having the short side in the lower position and the second anode/cathode rod is electrically connected to the flat plate electrodes having the short side in the upper position;
wherein the plurality of flat plate electrodes, plurality of insulated rods, plurality of insulator spacers, pair of metal rods and pair of anode/cathode rods are all housed within the tank or reactor that a fluid travels for fluid treatment;
wherein only one metal rod is used for electrically connected all of the plate electrodes serving as cathodes and only one metal rod is used for electronically connecting all of the plate electrodes serving as anodes.

2. The electro-catalytic paddle electrode assembly of claim 1 wherein said insulator spacers constructed from a corona resistant polytetrafluoroethylene material.

3. The electro-catalytic paddle electrode of claim 1 wherein the insulator spacers are adjustable in length or are of differing lengths to provide for an adjustable variable distance between adjacent plates.

4. The electro-catalytic paddle electrode of claim 1 wherein an outer surface of all of the flat plate electrodes are provided with outward extending protrusions to generate microturbulance and microeddies locally around the electrode.

5. The electro-catalytic paddle electrode assembly of claim 1 wherein each of the plates having a polarity and the polarity of alternate plates are switched back and forth from positive to negative and negative to positive at ultra high frequency rate in the range of about 1 kHz-20 kHz at very high current flows of about 200-2000 ampere using DC voltage and DC current.

6. The electro-catalytic paddle electrode assembly of claim 1 further comprising a chemical coating of about 10-100 μm thickness applied on a surface of each of the plate electrode.

7. The electro-catalytic paddle electrode assembly of claim 6 wherein the chemical coating is a mixture of Iridium Oxide, Ruthenium Oxide, Titanium Dioxide, and Platinum Oxide reacted in definite proportions in a presence of conductive polycrystalline diamond such that the electrodes with the chemical coating applied can withstand ultra high frequency switching of polarities at current flowing capacities of about 2000 Amperes.

8. The novel electro-catalytic paddle electrode assembly of claim 6 wherein the chemical coating acts as a catalyst producing additional oxidizing species in untreated fluid.

9. The electro-catalytic paddle electrode assembly of claim 6 wherein the chemical coatings is applied with a polycrystalline conductive diamond layer along the surface of the electrode to further increase the conductivity and stability of the electrode.

10. The electro-catalytic paddle electrode assembly of claim 1 wherein the fluid being treated within the tank or reactor is flow back produced water from oil and gas production fields, H2S/Mercaptan contaminated water from refineries, hospital waste water or municipal waste water.

11. The electro-catalytic paddle electrode assembly of claim 10 wherein treatment of the fluid occurring at the electrodes within the tank or reactor is precipitation or generation of oxidizing and reducing species such as radicals or molecules or ions or the combination of both.

12. The electro-catalytic paddle electrode assembly of claim 10 wherein said plate electrodes generating in situ oxidizing and reducing species to eliminate undesired constituents in untreated fluid streams and converting high TDS untreated fluid into low TDS treated fluid.

13. The electro-catalytic paddle electrode assembly of claim 1 wherein said plate electrodes are spaced apart at a distance having a range from about 0.5 inches to about 2.0 inches along the insulated rods by the insulator spacers.

14. The electro-catalytic paddle electrode assembly of claim 1 further comprising a chemical coating of about 10-100 μm thickness applied on a surface of the plate electrode, wherein the chemical coating is a mixture of Iridium Oxide, Ruthenium Oxide, Titanium Dioxide, and Platinum Oxide and the chemical coating acts as a catalyst producing additional oxidizing species in untreated fluid; wherein the chemical coatings is applied with a polycrystalline conductive diamond layer along the surface of the electrode to further increase the conductivity and stability of the electrode.

15. The electro-catalytic paddle electrode assembly of claim 1 wherein each plate electrode including a first straight edge having first end and a second end, a second straight edge having a first end and a second end, a third straight edge having a first end and a second end, a fourth straight edge having a first end and a second end and a fifth straight edge having a first end and a second, for each plate electrode a first end of the second straight edge terminating at the second end of first straight edge a first end of the third straight edge terminating at the second end of the second straight edge a first end of the fourth straight edge terminating at the second end of the third straight edge, a first end of the fifth straight edge terminating at the second end of the fourth straight edge and a first end of the first straight edge terminating at the second end of the fifth straight edge.

16. The electro-catalytic paddle electrode assembly of claim 1 wherein the insulator spacers having a length such that a space between adjacent flat plate electrodes of the plurality of flat plate electrodes is maintained at a distance from at least about 0.2 inches or greater.

17. The electro-catalytic paddle electrode assembly of claim 1 further comprising a plurality of metal spacers, each of the plurality metal spacers disposed on either the first metal rod or the second metal rod for providing electrical communication between the first metal rod and the second metal rod and the plate electrodes, the metal spacers coated with an electrocatalytic coating.

18. The electro-catalytic paddle electrode assembly of claim 1 further comprising a plurality of insulated nuts and a plurality of metal nuts, each of the plurality of insulated nuts secured at one end of one of the plurality of insulated rods and each of the plurality of metal nuts secured at one of end of one of the plurality of metal rods.

19. The electro-catalytic paddle electrode assembly of claim 1 further comprising a DC power supply having a positive and negative polarity outlet, wherein the plurality of anode/cathode rods are electrically connected to the DC power supply at the positive and negative polarity outlet of the DC power supply.

20. The electro-catalytic paddle electrode assembly of claim 19 wherein the DC power supply programmed to reverse polarity of the power supply at a set frequency of 1 kHz to 20 KHz causing a polarity of each of the plurality of flat plate electrodes to switch with each polarity reverses of the DC power supply creating a self cleaning capability for the electrodes and reactor by preventing scale build up within the tank or reactor or on the plurality of electrodes.

21. The electro-catalytic paddle electrode assembly of claim 1 wherein each flat plate electrode having a convex irregular pentagonal shape.

22. The electro-catalytic paddle electrode assembly of claim 1 wherein when all of the plurality of flat plate electrodes and plurality of metal rods are properly assembled all apertures of the plurality of apertures are filled by one of the plurality of metal rods or one of the plurality of insulating rods.

23. A electro-catalytic paddle electrode assembly disposed within a tank or reactor for creating hydroxyl radicals for treatment of a fluid traveling through the tank or reactor, the reactor tank having an internal treating area and having aft a plurality of inlet nozzles with each of the plurality of inlet nozzles disposed at an end of an associated one piping outlet of a plurality of piping outlets, wherein the plurality of piping outlets serving as inlets for influent water into the tank or reactor, comprising:
  a plurality of flat plate electrodes, each plate electrode having a short side and a long side, wherein the plurality of plate electrodes arranged in a pattern where the short side of adjacent flat plate electrodes of the plurality of flat plate electrodes alternate from being either disposed in a lower position or an upper position, each flat plate electrode of the plurality of flat plate electrodes having its short side located at a same first end as all other flat plate electrodes of the plurality of flat plate electrodes regardless of whether the short side is in the upper position or the lower position, each of the plurality of flat plate electrodes having a plurality of apertures therethrough with a first aperture of the plurality of apertures being located at the short side of the flat plate electrode and a second aperture of the plurality of apertures being located at the long side of the flat plate electrode, each of the electrodes having an outer surface;
  a plurality of insulated rods, each rod of the plurality of insulated rods inserted through a corresponding one of the apertures of the flat plate electrodes for holding the plurality of flat plate electrodes together;
  a plurality of insulator spacers, each of the plurality of insulated spacers having an internal passageway, wherein a rod of the plurality of insulated rods is inserted through the internal passageway of an insulated spacer such that the plurality of insulated spacers are disposed on a corresponding rod and are disposed between adjacent plate electrodes being held together by the plurality of insulated rods for separating the plate electrodes from each other;
  a pair of metal rods, a first of the pair of metal rods inserted through the first apertures of the flat plate electrodes having the short side in the lower position and a second of the pair of metal rods inserted through the first aperture of the flat plate electrodes having the short side in the upper position; and
  a pair of anode/cathode rods oriented perpendicular to the, a first of the pair of anode/cathode rods connected at a first end directly to the first of the pair of metal rods and a second of the pair of anode/cathode rods connected at a first end directly to the second of the pair of metal rods such that the first anode/cathode rod is electrically connected to the flat plate electrodes having the short side in the lower position and the second anode/cathode rod is electrically connected to the flat plate electrodes having the short side in the upper position;

wherein the plurality of flat plate electrodes, plurality of insulated rods, plurality of insulator spacers, plurality of metal rods and plurality of anode/cathode rods are all housed within the tank or reactor that a fluid travels for fluid treatment;

wherein the outer surface of the plurality of plate electrodes are sterilized by turbulence created by hydrodynamic cavitation of fluid within the tank or reactor at the inlet nozzle which results in organic contamination breakdown or removal from the outer surface of the plurality of plate electrode, wherein each of the plate electrodes having the same shape and dimensions regardless of whether the plate electrode is being used as a cathode or an anode;

wherein a certain amount of plate electrodes are used as anodes and an equal amount of plate electrodes are used as cathodes to provide for a balanced and uniformed current distribution across the anode and cathode;

wherein only one metal rod is used for electrically connected all of the plate electrodes serving as cathodes and only one metal rod is used for electronically connecting all of the plate electrodes serving as anodes.

24. The electro-catalytic paddle electrode assembly of claim 23 wherein each of the plates having a polarity and the polarity of alternate plates are switched back and forth from positive to negative and negative to positive at ultra high frequency rate in the range of about 1 kHz-20 kHz at very high current flows of about 200-2000 ampere using DC voltage and DC current.

\* \* \* \* \*